United States Patent [19]
Smith

[11] Patent Number: 4,812,986
[45] Date of Patent: * Mar. 14, 1989

[54] APPARATUS FOR DISPENSING MONEY ORDERS

[75] Inventor: Lawrence G. Smith, Orlando, Fla.

[73] Assignee: Republic Money Orders, Inc., Dallas, Tex.

[*] Notice: The portion of the term of this patent subsequent to Nov. 16, 1999 has been disclaimed.

[21] Appl. No.: 60,762

[22] Filed: Jun. 8, 1987

Related U.S. Application Data

[62] Division of Ser. No. 877,539, Oct. 31, 1986, Pat. No. 4,699,532, which is a division of Ser. No. 596,291, Apr. 3, 1984, Pat. No. 4,625,275.

[51] Int. Cl.$^4$ .................... G06F 15/21; G06F 15/30; B41J 5/00
[52] U.S. Cl. .................... 364/479; 235/379; 380/24; 400/104; 902/1
[58] Field of Search ... 364/200 MS File, 900 MS File, 364/400, 401, 406, 408, 478, 479, 519, 405; 235/375, 379–382.5, 432, 433, 431; 400/121, 124, 104–106, 50, 103; 380/24; 902/1, 2

[56] References Cited

U.S. PATENT DOCUMENTS

| | | | |
|---|---|---|---|
| 3,814,227 | 6/1974 | Hurd, III et al. | 400/121 |
| 3,848,798 | 11/1974 | Riley | 235/101 |
| 3,970,992 | 7/1976 | Boothroyd | 364/900 |
| 3,984,660 | 10/1976 | Oka et al. | 235/379 |
| 3,997,763 | 12/1976 | Schasser | 235/432 |
| 4,025,905 | 5/1977 | Gorgens | 364/900 |
| 4,035,792 | 7/1977 | Price et al. | 340/570 X |
| 4,053,735 | 10/1977 | Foudos | 364/401 X |
| 4,082,945 | 4/1978 | van de Goor et al. | 235/379 |
| 4,175,694 | 11/1979 | Donabin | 235/431 X |
| 4,225,779 | 9/1980 | Sano et al. | 364/900 X |
| 4,266,121 | 5/1981 | Hirose | 235/381 |
| 4,270,042 | 5/1981 | Case | 235/379 |
| 4,317,028 | 2/1982 | Simjian | 235/379 X |
| 4,341,951 | 7/1982 | Benton | 364/406 X |
| 4,355,369 | 10/1982 | Garvin | 364/900 |
| 4,385,285 | 5/1983 | Horst et al. | 235/379 X |
| 4,417,137 | 11/1983 | Lundblad | 235/379 |
| 4,625,275 | 11/1986 | Smith | 364/479 X |
| 4,699,532 | 10/1987 | Smith | 364/479 X |

Primary Examiner—Joseph Ruggiero
Attorney, Agent, or Firm—Michael A. O'Neil

[57] ABSTRACT

A method and apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-eraseable programmable read only memory (E$^2$PROM) for storing a security inhibit printing code, this code being automatically changed to prevent actuation of the printer when the security of the dispenser is compromised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

11 Claims, 3 Drawing Sheets

APPARATUS FOR DISPENSING MONEY ORDERS

This is a division of application Ser. No. 877,539, filed Oct. 31, 1986, now U.S. Pat. No. 4,699,532, which is a division of application Ser. No. 596,291, filed Apr. 3, 1984, now U.S. Pat. No. 4,625,275.

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vendor portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser combersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overall operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programmable read only memory ($E^2PROM$). This $E^2PROM$ stores a security inhibit printing code which must be "recognized" by a printer software routine to enable the dot matrix printer. Each dispenser further stores a control software routine which operates to change or erase the security inhibit printing code stored in the $E^2PROM$ when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order in a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the $E^2PROM$ associated with each processor.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
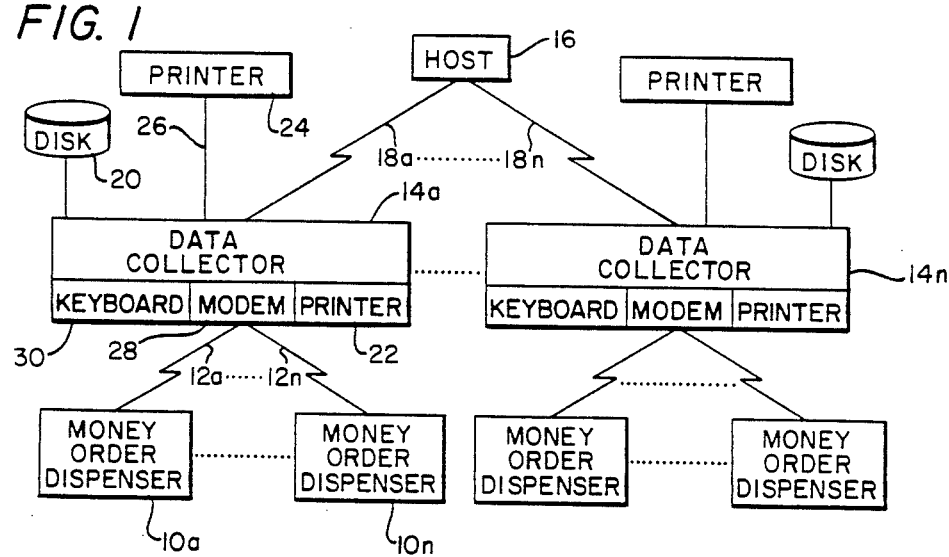
FIG. 1 is a block diagram of a desired system configuration incorporating a plurality of money order dispensers connected to one or more data collector devices, which are in turn connected to a host device.

With reference now to the FIGURES wherein like reference characters designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a-10n on a time-shared basis. In the preferred embodiment, a plurality of data collectors 14a-14n are connected to a host device 16 through communications links 18a-18n. Each communications link 18 is either a modem link or an RS232 serial full-duplex interface for direct connection to the host device 16. Alternately, the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a-10n. Data collector 14a also includes an internal printer 22 for printing this transaction information, although alternately, an external printer 24 is used for this purpose through an RS232 serial link 26. An internal modem 28 is also provided for direct communications to the money order dispensers 10a-10n over the communications links 12a-12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator sets limits on the following variables listed in TABLE I:

TABLE I

| VARIABLE NAME | DEFINITION |
| --- | --- |
| [—MCH MO# XXXXX—] | Total number of money orders to be printed before dispenser must be reauthorized |
| [—MCH MO# XXXXXXX—] | Maximum money order dollar amount to be issued before dispenser must be reauthorized |
| [—CST MO$ XXXXX.XX—] | Maximum dollar value per money order per customer |
| [—MCH CK# XXXXX—] | Maximum number of vendor payments which may be printed before dispenser must be reauthorized |
| [—MCH CK# XXXXX.XX—] | Maximum vendor payment dollar amount which can be issued before dispenser must be reauthorized |
| [—CST MO# XXXX—] | Maximum number of money orders which can be printed per customer |
| [—VND CK# XXXX—] | Maximum number of vendor payments which can be printed per vendor |
| [—VND CK# XXXXX.XX—] | Maximum dollar amount per vendor payment |
| [—WARN—#BLANKS XX—] | Number of blank money orders left in dispenser when warning issued |
| [—WARN—#TRANS XX—] | Amount of transaction storage left in dispenser memory when warning is issued |
| [—LOCK # ERRORS XX—] | Number of errors allowed before dispenser locks. |

As used throughout the remainder of the specification, the above limits and codes are referred to as "control" data. This control data is transmitted to the various money order devices 10a-10n located at the plurality of retail establishments.

Preferably, each of the other data collectors 14 shown in FIG. 1 include the same type of peripheral devices associated with the data collector 14a. The data collectors 14a-14n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invention is capable of fully independent stand-alone operation, as well as a direct on-line connection to a point-of-sale system.

Figure 2:
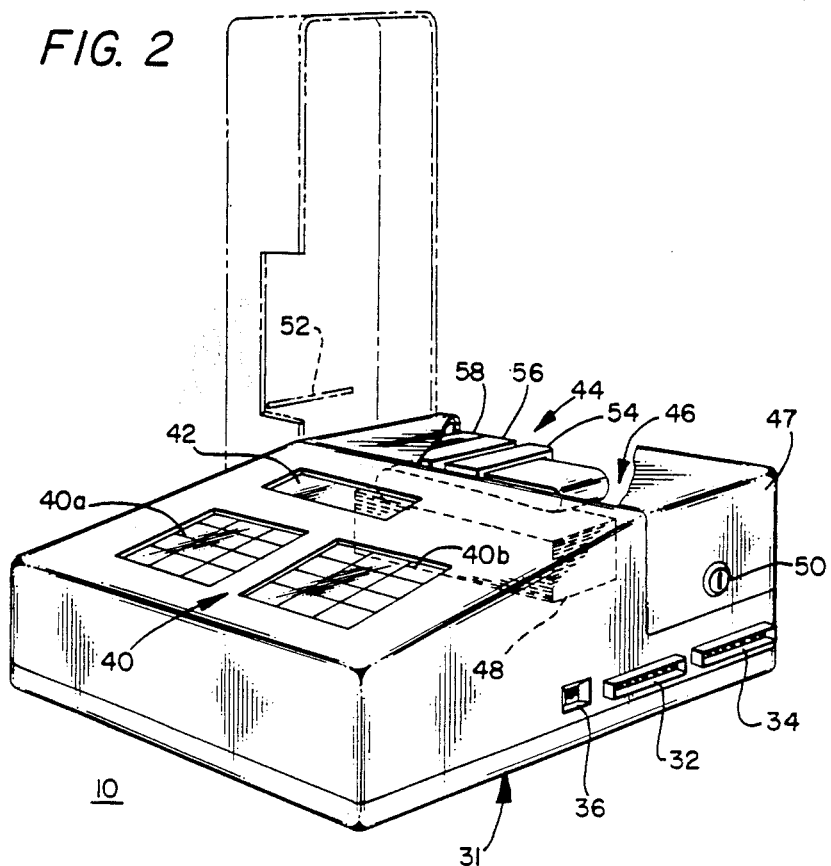
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retain establishment by appropriate securing means. The dispenser 10 is designed to be operable from 115 volts a.c. power, or d.c. power from an appropriate point-of-sale system. The power options are selectable by an internal selection switch (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen in FIG. 2, the storage compartment cover 47 includes an output throat 52 through which the printed money orders are dispensed. To effect printing of a money order, the diot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means is required since normal printing of the indicia would render the money order unreadable due to the transverse feed. Accordingly, a printer software routine to be described is provided for controlling the printer to produce readable alphanumeric indicia on the printed money orders.

Figures 3, 4:
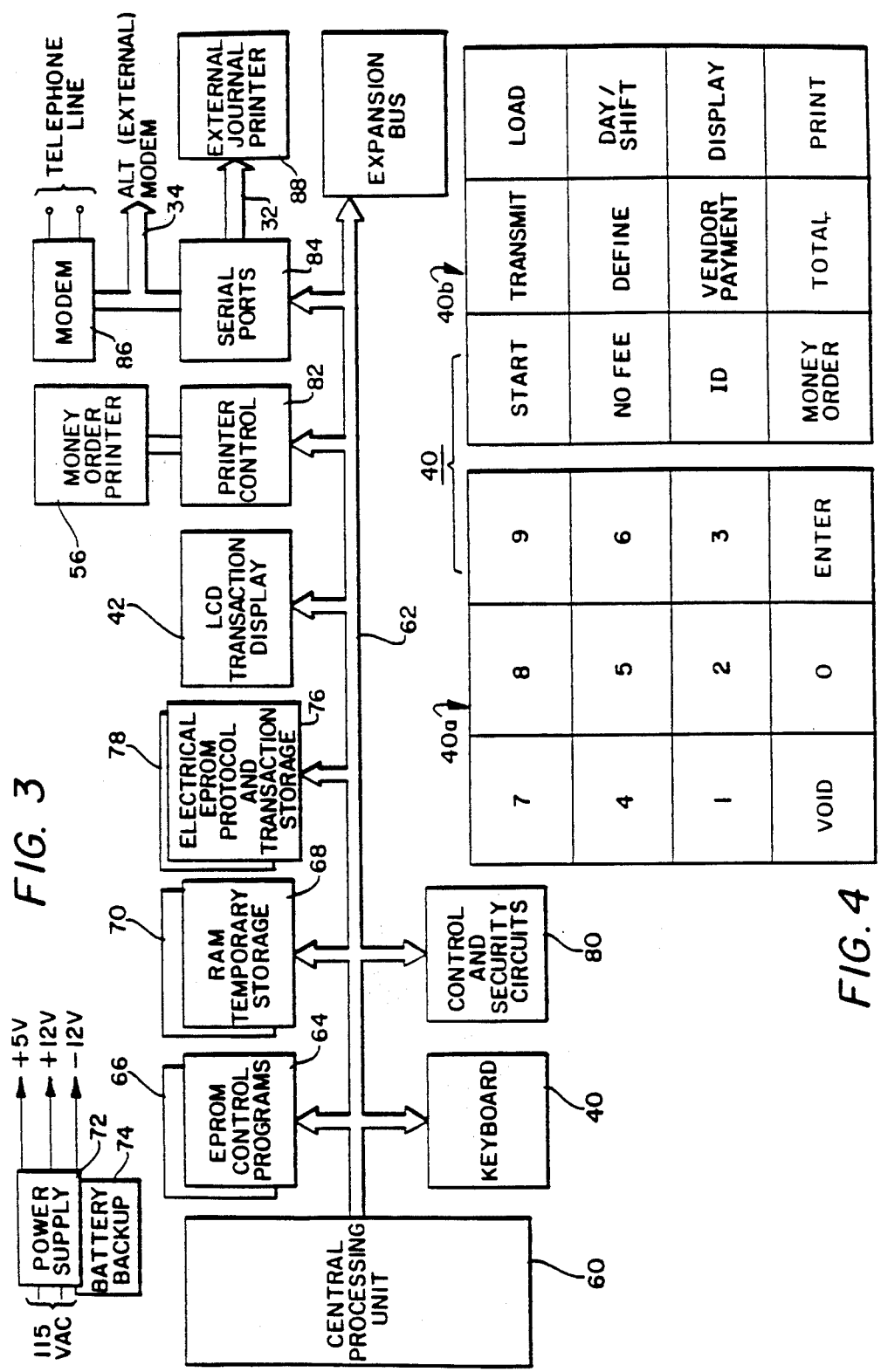
FIG. 3 is a block diagram of the electronic hardware incorporated in the money order dispenser of FIG. 2.
FIG. 4 is a representation of the preferred embodiment of the keyboard used in the money order dispenser of FIG. 2.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM's 64 and 66 are connected to the CPU 60 by the bus 62. As also seen in FIG. 3, the money order dispenser 10 includes random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power be suddenly interrupted to the dispenser 10.

The money order dispenser 10 further includes a pair of electrically-eraseable programmable read only memories (E$^2$PROM's) or equivalent semi-permanent memory device such as a battery support RAM, 76 and 78 connected to the CPU 60 by the bus 62. The E$^2$PROM 76 is provided for storing various communication protocols utilized by the money order dispenser. In particular, the E$^2$PROM 76 supports the NCR foreign attachment protocol, MSI special protocol, SDLC protocol and IBM 3680 store system interface. Additional protocols may be down-loaded into the E$^2$PROM 76 by the data collector as required. Data and control codes for the above protocols are well known in the prior art and a description thereof is unnecessary for a complete understanding of the present invention.

According to a feature of the present invention, the E$^2$PROM 78 is provided to store the transaction data for between 500–2000 vendor/customer transactions. Moreover, the E$^2$PROM 78 also stores a security inhibit printing code for the money order dispenser 10 for security purposes. The printer software routine for controlling the dot matrix printer 56 must "recognize" the security inhibit printing code resident in E$^2$PROM 78 in order to operate the dot matrix printer 56. If the security of the money order dispenser is compromised in any way, a control software routine stored in EPROM 64 operates to change or erase the security inhibit printing code stored in the E$^2$PROM 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromised" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, if a previously determined amount or number of money orders, or other system operator-imposed constraints, have been exceeded, or if no recent communications have taken place within authorized time limits.

A control and security circuit 80 is also provided and includes an internal clock for controlling the timing of the various circuits shown in FIG. 3, and also for defining the date and time information for the transaction data. As discussed above, the LCD display 42 is provided for displaying this transaction data as well as system messages. The display software stored in EPROM 66 also disables the display if the dispenser is not in use for a period of time, and controls the display to indicate when the E$^2$PROM 78 is approximately filled with transaction data. The money order dispenser 10 will discontinue further issuance of money orders and notify the operator if the E$^2$PROM 46 is full. According to the present invention, the transaction data is then transmitted to the respective data collector device of FIG. 1 before the money order dispenser 10 may again issue money orders. The use of the non-volatile reusable E$^2$PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software routine. The money order dispenser 10 further includes serial ports 84, connected to the CPU 60 by the bus 62, for driving an internal modem 86, and the external journal printer 88 via an RS232 duplex link. As noted above, when the internal modem 86 is not used, the modem interface is brought to the RS232 connector jack 34 for an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"–"9" for entering control and transaction data, and a "VOID" and "ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys if the second section 40b. The following message is then displayed on the display 42:

[-SECURITY #---]

The security number is a five digit number and is not displayed. This number must be correctly entered by the vendor in order for the sequence to continue. After the security number has been entered and verified, a manual entry of a store identification number is required. Accordingly, the following store number message is displayed on the LCD display 42:

[-STXXXXXXXXXXXXXX-]

The store number may be 1-14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:

[-DATE XX/XX/XX-]

[-TIME XX:XX:XX-]

The Definition Mode sequence further continues with the following displays for entering of identification entries, money order fees, a phone number dialed automatically under certain conditions, and an "ID USE" code for money order and vendor payment transactions:

[-ID XXX-]

[-FEE XXX.XX, YY.YY-]

[-PHX-XXX-XXX-XXXX-]

[-ID USE  X-]

Specifically, the system includes twenty money order fees where XXX.XX is the dollar breakpoint, and YY.YY is the fee charged for any money order greater than the previous money order and less than or equal to the present XXX.XX breakpoint. The "ID USE" code takes on the following possible values:

0—No ID Number needs to be entered;
1—All ID Numbers are entered at the start of the day only;
2—A valid ID Number must be entered for each transaction.

Entering of the above code information at the money order dispenser, as well as the information in TABLE I at the data collector, constitutes the Definition Mode. Once the last enter key has been pressed at the dispenser, the display screen 24 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be displayed:

[-ID -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 92 is also depressed. Subsequently, a dollar amount for the money order is entered via the numeric keys of the first section 40a followed by depression of the "MONEY ORDER" key of section 40b. The "TOTAL" key of section 40b is then depressed if more than one money order is required to be printed. The fee for each money order is automatically added to the total. Finally, the "PRINT" key of section 40b is then depressed and the requested money order is printed by the dot matrix printer 56 as discussed above with respect to FIG. 2. Note that if the "VOID" key of section 40a is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40b is depressed followed by the "TOTAL" and "PRINT" keys as discussed above with respect to the issuance of a money order.

Under a "Load Mode", money order forms are loaded into the money order dispenser 10. This is accomplished by opening the money order storage compartment cover 47, depressing the "START" key and then a "LOAD" key of section 40b. Depression of these keys will produce the following sequential display messages:

[-SECURITY # -]

[-BEG # XXXXXXXX-]

[-END # XXXXXXXX-]

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40b. Upon depression of these keys, the following sequential display messages occur:

[-SECURITY # -]

[-DIAL TELEPHONE #-]

After entering of the security number and dialing the telephone number for connection to the appropriate data collector, the operator places the phone receiver in the modem. The "START" key is then depressed to cause the dispenser to transmit the stored transaction data in E²PROM 78 to the data collector. After transmission the following message is displayed to prompt the operator to disconnect the dispenser from the modem:

[−DISCONNECT RMOD−]

This constitutes the Transmission Mode. Once the last data is transmitted nd a verification signal is received by the money order dispenser, the dispenser automatically terminates the connection, displays the above disconnect message and exits the Transmission Mode.

As discussed above, an important feature of the present invention is the use of the dot matrix printer 56 which is designed to receive a money order in a transverse direction with respect to the printing of normal indicia thereon. The movement of money orders through the dot matrix printer in a transverse fashion facilities the use of a small dot matrix printer, thereby reducing the overall dimensions of the money order dispenser of the present invention. However, since the money order is passed through the dot matrix printer in a transverse fashiin, normal printing of indicia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Figure 5:
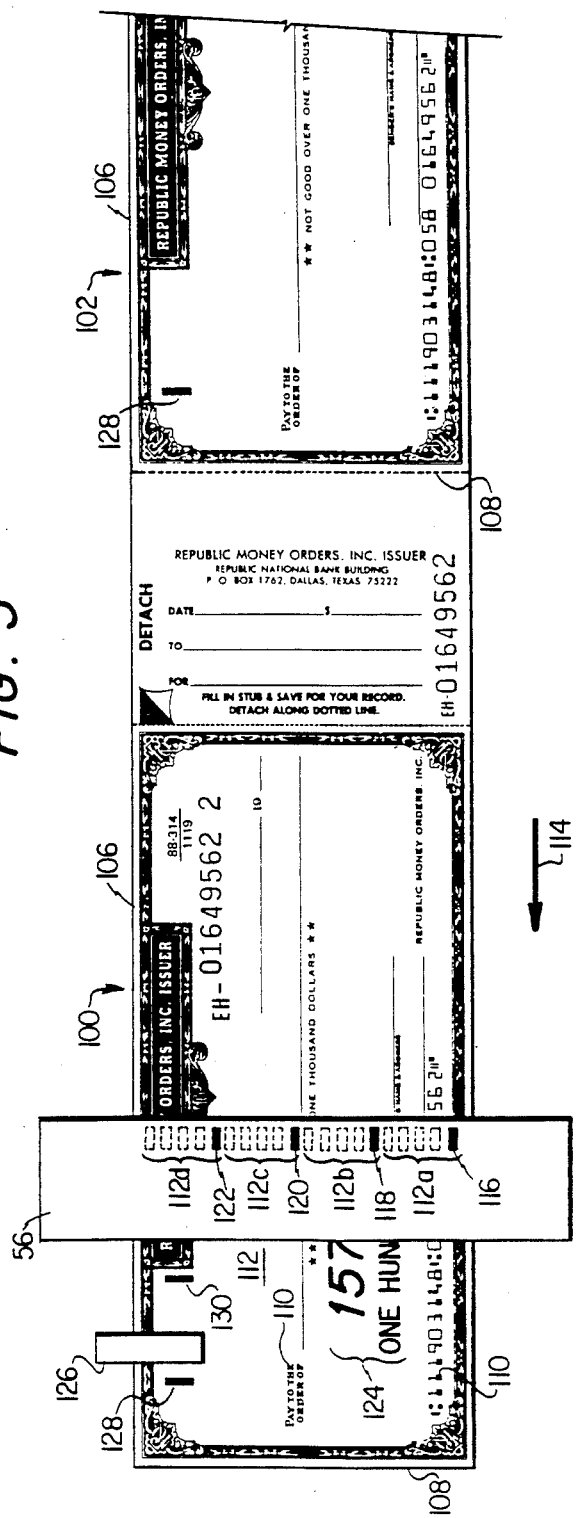
FIG. 5 is a top view of the dot matrix printer incorporated in the dispenser of FIG. 2 detailing the movement of a money order therethrough.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example elements 116, 118, 120 and 122, each of which reciprocate transversely to print alphanumeric indicia in four regions of the printing zone 112. Specifically, print element 116 moves transversely through the region 112a of the printing zone 112, print element 118 moves transversely through the printing zone 112b, and so forth.

Printer 56 extends transversely across the printing zone 112 for printing variable alphanumeric indicia on the money order forms. It should be appreciated, however, that since the dot matrix printer normally prints indicia in a transverse direction, normal operation of th printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of th printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth below:

```
EEPROM DATA AREA

PAGE
;EEPROM DATA LOCATED AT E000H-E3FFH
EPRM      SEGMENT AT 0E000H
;DOWN LOADED STORE INFORMATION
SCRTY     DM        ?              :SECUTITY NUMBER
STACC     DM        ?              :STORE #  MAJOR ACCOUNT
STSTE     DB        ?              :STORE #  STATE
STSUB     DB        ?              :STORE #  SUB ACCOUNT
STDIV     DM        ?              :STORE #  DIVISION
STSTR     DM        ?              :STORE #  STORE
MONTH     DB        ?              :DATE  MONTH
DAY       DB        ?              :DATE  DAY
YEAR      DB        ?              :DATE  YEAR
PHONE     DB        11 DUP(?)      :TELEPHONE NUMBER
USE       DB        ?              :ID USE CODE 0 NO ID NEEDS TO
                                   BE ENTERED
                                   :1=ONE ID PER SHIFT/DAY
                                   :2=ID FOR EVERY TRANSACTION
ID        DB        NID DUP(?)     :IDENTIFICATION NUMBERS

:RMOD STATUS INDICATORS - 0/1
RMODS     DB        ?              :RMOD STATUS - CLOSED/OPEN
MODMS     DB        ?              :MODEM STATUS - DISCNCT/DNCT
CMPPS     DB        ?              :MC PRINTER STATUS -
                                   OK/DISABLED
JRRRS     DB        ?              :JR PRINTER STATUS - OK
                                   DISABLED

RO Assembles 03-06-84              PAGE 1-8

EEPROM DATA AREA

KEYBS     DB        ?              :KEYBOARD STATUS - OK/LOCKED

;DATA DETERMINED AT RUN TIME-STORED HERE TO PRESERVE WHEN POWER
OFF
LOCKC     DB        ?              :ERROR COUNT BEFORE LOCKUP
TRPTR     DB        ?              :TRANSACTION POINTER
TXPTR     DB        ?              :TRASMISSION POINTER
FIDT      DB        NID DUP (?)    :FEE TOTAL PER ID

MCNT      DW        ?              :MO NUMBER TOTAL
MAMT      DD        ?              :MO AMOUNT TOTAL
VCNT      DW        ?              :VP NUMBER TOTAL
VANT      DD        ?              :VP AMOUNT TOTAL
FAMT      DD        ?              :FE AMOUNT TOTAL
VOID      DW        ?              :NUMBER OF VOIDS
TCNT      DW        ?              :TOTAL TRANSACTIONS
TAMT      DD        ?              :TOTAL AMOUNT

:TRNSACTION BUFFER-FILLS UP REST OF EEPROM-ROTATING BUFFER
TRBFRS    DB        ?              :START OF TRANSACTION BUFFER
TRBFRE    DB        ?              :END OF TRANSACTION BUFFER
EPRM      ENDS

:EEPROM DATA LOCATED E4000H-E5FFFH
:DOWN LOADED PROTOCOL INFORMATION
EPRM      SEGMENT AT 0E400H
:$$$NO DATA DEFINED$$$
EPRM      ENDS
SUBTTL    START OF PROGRAM - POWER OF SELF TEST AND
          INITIALIZATION AT FE000H
```

START OF PROGRAM

```
        PAGE

CODE    SEGMENT OF AFE00H
START:  CLI                     ;DISABLE INTERRUPTS
                                ;TEST FLAGS, REGISTERS,
                                      CONDITIONAL JUMPS
        MOV     AH,0D5H         ;SET FLAGS-SF,ZF,AF,PF,CF
        SAHF
        JNS     STERR
        JNZ     STERR
        JNP     STERR
        JNC     STERR
        LAHF
        MOV     CL,5            ;SET CARRY
        SHR     AH,CL
        JNC     STERR
        MOV     AL,40H          ;SET OVERFLOW
        SHL     AL,1
        JNO     STERR
        XOR     AX,AX           ;CLEAR FLAGS
        SAHF
        JS      STERR
        JZ      STERR
        JP      STERR
        JC      STERR
        LAHF
        MOV     CL,5            ;RESET CARRY
        SHR     AH,CL
        JC      STERR
        SHL     AH,1            ;RESET OVERFLOW
        JO      STERR
                                ;TEST REGISTERS WITH ALL ONE'S
                                    AND ZERO'S
        MOV     AX,0FFFFH
        STC                     ;SET CARRY - LOOP CONTROL
STRT1;  MOV     DX,AX           ;LOOP TO WRITE PATTERN TO ALL
                                    REGISTERS
        MOV     BX,DS
        MOV     ES,BX
        MOV     CX,ES
        MOV     SS,CX
        MOV     DX,SS
        MOV     SP,DX
        MOV     BP,SP
        MOV     SI,BP
        MOV     DI,SI
        JNC     STRT2
        XOR     AX,DI           ;END OF FIRST TIME THROUGH
        JNZ     STERR           ;PATTERN NOT ALL ONE'S
        CLC                     ;CLEAR CARRY
        JNC     STRT1           ;REPEAT WTIH ALL ZERO'S
STERR;  HLT                     ;POWER ON SELT TEST ERROR
STRT2;  OR      AX,DI           ;END OF SECOND TIME THROUGH
        JNZ     STERR           ;PATTERN NOT ALL ZERO'S
                                ;TEST RAM WITH FF,AA,55,01,00
                                      PATTERNS
        SUB     AX,AX           ;INITIALIZE ES & DS
        MOV     ES,AX
        MOV     DS,AX
        SUB     DI,DI
        MOV     BX,LMCSD        ;COMPUTE UPPER LIMIT OF RAM
        MOV     CL,4
        SHL     BX,CL           ;CANNOT BE > 0FFFFH
        OR      BX,002EH        ;RAM COUNT
        MOV     AX,0FFFFH
        MOVE    DX,55AAH
        CLD                     ;INCREMENT FLAG
        MOV     CX,BX           :COUNT
        REP     STOSB           :FILL RAM WITH FIRST PATTERN
STRT3:  DEC     DI              :POINT TO LAST BYTE
        STD                     :DECREMENT FLAG
```

```
STRT4:  MOV    SI,DI
        MOV    CX,BX
STRT5:  LODSB              :READ PATTERN STORED
        XOR    AL,AH       :TEST IF OK
        JNE    STERR       :TEST NOT OK
        CMP    AH,0
        JE     STRT6       :ZERO PATTERN
        MOV    AL,DL
        STOSB              :WRITE NEXT PATTERN
STRT6:  LOOP   STRT5       :CONTINUE UNTIL ALL OF RAM TEST
        CMP    AH,0
        JE     STRT7       :RAM TEST COMPLETE
        MOV    AH,AL       :ROTATE PATTERN
        XCHG   DH,DL
        CLD                :INCREMENT FLAG
        INC    DI          :POINT TO START BYTE
        JZ     STRT4       :READ/WRITE FORWARD
        DEC    DI          :READ/WRITE BACKWARD
        MOV    DX,1        :00 AND 01 PATTERN
        JMP    STRT3
                           :INITIALIZE SEGMENT REGISTER & STACK
STRT7   MOV    AX,DATA
        MOV    DS,AX
        MOVE   AX,EPRM
        MOV    ES,AX
        MOVE   AX,STACK
        MOV    SS,AX
        MOV    SP,OFFSET STACKT
                           :INITIALIZE THE CHIP SELECT
                           CONTROLLER
        MOV    DX,LMCSR    :LOWER MEMORY CHIP SELECT
        MOVE   AX,LMCSD    :16K at 0 - 3FFFH
        OUT    DX,AX
        MOV    DX,PACSR    :PERIPHERAL CHIP SELECT
        MOV    AX,PACSD
        OUT    DX,AX
        MOV    DX,MMCSR    :MID-RANGE MEMORY CHIP SELECT
        MOV    AX,MMCSD    :16K AT E0000H
        OUT    DX,AX
        MOV    DX,MPCSR    :MID-RANGE MEMORY SIZE
        MOV    AX,MPCSD
        OUT    DX,AX
                           :INITIALIZE 8155 - A
        MOV    DX,A8155CS  :CONTROLS CLOCK, KEYBOARD, DISPLAY
        MOV    AL,A8155CD  :PORT A,B,C OUTPITS, NO TIMER
        OUT    DX,AL
        INC.   DX          :PORT A ADDRESS
        MOV    AL,A8155DA  :ALL OUTPUTS HIGH
        OUT    DX,AL
        INC    DX          :PORT B ADDRESS
        OUT    DX,AL
        INC    DX          :PORT C ADDRESS
        OUT    DX,AL
        INC    DX          :TIMER LOW COUNT ADDRESS
        MOV    AL,A8155TD  :NO TIME
        OUT    DX,AL
        INC    DX          :TIMER HIGH COUNT ADDRESS
        OUT    DX,AL

:INITIALIZE 8155 - B
        MOV    DX,B8155CS  :MONITORS DIP SWITCHES
        MOV    AL,B8155CD  :PORT A INPUTS, B&C OUTOUTS, NO TIMER
        OUT    DX,AL
        INC    DX          :PORT A ADDRESS
        MOV    AL,B8155DA  :ALL INPUTS HIGH
        OUT    DX,AL
        INC    DX          :PORT B ADDRESS
        OUT    DX,AL       :ALL OUTPUTS HIGH
        INC    DX          :PORT C ADDRESS
        OUT    DX,AL
        INC    DX          :TIMER LOW COUNT ADDRESS
        MOV    AL,B8155TD  :NO TIME
```

```
                OUT     DX,AL
                INC     DX
                OUT     DX,AL           :TIMER HIGH COUNT ADDRESS
:$$$NO PROGRAM YET$$$                   :INITIALIZE THE DMA CONTROLLER
:$$$NO PROGRAM YET$$$                   :INITIALIZE THE TIME CONTROLLER
:$$$NO PROGRAM YET$$$                   :INITIALIZE THE INTERRUPT CONTROLLER
                CALL    CLKINT          :INITIALIZE CLOCK
                CALL    DSPINT          :INITIALIZE DISPLAY
                CALL    JPRTINT         :INITIALIZE JOURNAL PRINTER
                CALL    CPRTINT         :INITIALIZE CHECK PRINTER
                                        :SET UP INTERRUPT VECTOR TABLE
                MOV     ES:NMIPTR,OFFSET NMI
                MOV     ES:NMIPTR+2, CODE
                MOV     ES:TMROPTR,OFFSET TMRO
                MOV     ES:TMROPTR+2, CODE
                MOV     ES:DMAOPTR, OFFSET DMA0
                MOV     ES:DMAOPTR+2,CODE
                MOV     ES:DMA1PTR,OFFSET DMA1
                MOV     ES:DMA1PTR+2,CODE
                MOV     ES:INTOPTR,OFFSET INTO
                MOV     ES:INTOPTR+2,CODE
                MOV     ES:CLCKPTR,OFFSET CLCK
                MOV     ES:CLCKPTR+2,CODE
                MOVE    ESLINT2PTR,FFSET INT2
                MOV     ES:INT2PTR+2,CODE
                MOV     ES:INT3PTR,OFFSET INTO
                MOV     ES:INT3PTR+2,CODE
                MOV     ES:TMR1PTR,OFFSET TMR1
                MOV     ES:TMR1PTR+2,CODE
                MOV     ES:TMR2PTR,OFFSET TMR2
                MOV     ES:TMR2PTR+2,CODE

CALL    DSPCLR          :CLEAR DISPLAY
                CLD                     :FILL KEYBOARD BUFFER WITH SPACES
                MOV     DI,OFFSET KBFR
                MOVE    CX,SKBFR
                MOV     AL,20H
        REP     STOSB
                STI                     :ENABLE INTERRUPTS
STRT9:          CALL    RMDCK           :CHECK RMOD
                CALL    KEYB            :SCAN KEYBOARD
                CALL    PWRCK           :CHECK FOR POWER DOWN
                JMP     STRT8           :LOOP FOREVER
CODE            ENDS

:POWER ON RESET VECTOR - LOCATED AT 0FFFFF0H
RESET   SEGMENT AT 0FFFFH
        MOV     DX,UMCSR        ;UPPER MEMORY CHIP SELECT
        MOV     AX,UMCSD        :BK AT FE000H
        OUT     DX,AX
        JMP     FAR PTR START
        DB      'RM00'
RESET ENDS
        END

CRO Asembler 03-05-84  Page 1-3

INT VECTOR 3 - NON MASKABLE INTERRUPT - RMOD INTERLOCK

Page

;NMI            PROCEDURE-REENTRANT, NONMASKABLE INTERRUPT
        ;                 ENTRY-INTERRUPT 2
        ;                   EXIT-RMODS=1 - OPEN
                        PUBLIC NMI
        NMI             PROC            NEAR
                        PUSH            BP
                        MOV             BP, SP   ;ESTABLISH BASE POINTER
                        PUSH            BX
                        PUSH            AX
                        PUSHF
                        MOV             BX,OFFSET RMODS   ;WRITE RMOD OPEN
                                                                INDICATOR
```

```
              MOV          AL,01H
              CALL         WEEPRM      ;WRITE TO EEPROM ONE
                                                    BYTE
              POPF
              POP          AX
              POP          BX
              POP          BP
              IRET
   NMI        ENDP
   SUBTTL                  INTO - INTERRUPT 0
```

```
        TITLE    RMDCK - CHECK RMOD STATUS REGISTERS
        PAGE     66,132
CGROUP  GROUP    CODE, CONST, RESET
CGROUP  GROUP    INTV, STACK,D ATA
EGROUP  GROUP    PRM

EPRM    SEGMENT  PUBLIC EPRM
        EXTRN    RMODS:BYTE, CKPRS:BYTE
        EXTRN    JRPRS:BYTE, KEYBS:BYTE, LCCKC:BYTE
        EXTRN    LOCK:BYTE
EPRM    ENDS

CODE    SEGMENT PUBLIC CODE
ASSUME  CS:CGROUP, DS:DGROUP, SS:DGROUP,ES:EGROUP
        EXTRN    WEEPRM:NEAR

;RMDCK PROCEDURE - CHECK ALL VITAL RMOD STATUS REGISTERS
;        IF RMOD WAS OPENED                      - RMODS=1 OR
;        IF ERROR COUNT EQUALS MAXIMUM           - LOCKC=LOCK
;        THEN MONEY ORDER PRINTER IS DISABLED    - CKPRS=1AND
;           JOURNAL PRINTER IS DISABLED          - LRPRS=1AND
;           KEYBOARD IS LOCKED                   - KEYBS=1
        PUBLIC RMDCK
RMDCK   PROC     NEAR
        XOR      AL,AL
        TEST     RMODS,01H      ;TEST RMOD FOR OPEN
        JNZ      RMDCK1         ;OPEN
        MOV      AH,LOCKC       ;ERROR COUNT
        CMP      AH,LOCK        ;MAXIMUM ERROR COUNT
        JB       RMDCK2         ;MAXIMUM ERROR COUNT
                                        NOT REACHED
RMDCK1: INC      AL
RMDCK2: MOV      BX,OFFSET CKPRS ;MONEY ORDER PRINTER-
                                        0=ENABLE,1=DISABLE
        CALL     WEEPRM
        INC      BX             ;JOURNAL PRINTER - 0=ENABLE,1=DISABLE
        CALL     WEEPRM
        INC      BX             ;KEYBOARD        - 0=ENABLE,1=LOCKED
        CALL     WEEPRM
        RET
RMDCK   ENDP
CODE    ENDS
        END
```

```
TITLE         KEYB - KEYBOARD MODULE
     Page     66,132

DATA    SEGMENT OUBLIC 'DATA'
EXTRN   MOVP:BYTE   TOTS:BYTE   DSPR:BYTE   SHFT:BYTE FEEC:BYTE
EXTRN   KEY:BYTE    KEYP:BYTE   KEYT:BYTE   KEYD:BYTE
EXTRN   KNDG:BYTE   KCMD:BYTE   KPCMD:BYTE
EXTRN   KENTN:BYTE  KENTP:WORD
EXTRN   KNBR:BYTE   KFLD:BYTE   KLCK:BYTE
EXTRN   KDSP:BYTE   KONT:BYTE   KTPE:BYTE
EXTRN   KLLMT:DWORD             KULMT:DWORD
EXTRN   KPTR:DWORD  KBIN:DWORD  KBPTR:DWORD
```

```
        EXTRN   CHR:BYTE    CMIN:BYTE   CSEC:BYTE
        EXTRN   CSCRTY:WORD
        EXTRN   CSACC:DWORD             CXNBR:DWORD  CSCHK:BYTE
        EXTRN   CID:BYTE    CIDL:BYTE
        EXTRN   CCNT:WORD   CAMT:DWORD  DFEE:DWORD   CTOT:DWORD
        EXTRN   DFIDT:DWORD
        EXTRN   CMCNT:WORD  CMAMT:DWORD
        EXTRN   CVCNT:WORD  CVAMT:DWORD
        EXTRN   CTCNT:WORD  CTAMT:DWORD
        EXTRN   KBFR:BYTE   DBFR:BYTE   SCRTCH:BYTE
DATA    ENDS

EPRM SEGMENT PUBLIC 'EPRM'
        EXTRN   SCRTY:WORD
        EXTRN   STACC:WORD  STSTE:BYTE  STSUB:BYTE   STDIV:WORD  STSTR:WORD
        EXTRN   MONTH:BYTE  DATE:BYTE   YEAR:BYTE
        EXTRN   PHONE:BYTE
        EXTRN   USE:BYTE                ID:BYTE
        EXTRN   FEELMT:DWORD            FEEAMT:DWORD
        EXTRN   MCNTC:WORD              MCNTM:WORD
        EXTRN   MAMTC:DWORD             MAMTM:DWORD
        EXTRN   VCNTC:WORD              VCNTM:WORD
        EXTRN   VAMTC:DWORD             VAMTM:DWORD
        EXTRN   BLANKS:BYTE             TRANS:BYTE   LOOK:BYTE
        EXTRN   BSACC1:WORD   BSNBS1:DWORD      BSCHK1:BYTE
        EXTRN   ESACC1:WORD   ESNBR1:DWORD      ESCHK1:BYTE
        EXTRN   BSACC2:WORD   BSNBR2:DWORD      BSCHK2:BYTE
        EXTRN   ESACC2:WORD   ESNBR2:DWORD      ESCHK2:BYTE
        EXTRN   RMODS:BYTE    MODMS:BYTE        CKPRS:BYTE
        EXTRN   JRPRSLBYTE    KEYBS:BYTE        LOCKS:BYTE
EPRM ENDS

CODE SEGMENT PUBLIC 'CODE'
        EXTRN   PWRON:NEAR
        EXTRN   WEEPRM:NEAR
        EXTRN   TRNS:NEAR
        EXTRN   DISP:NEAR   JPRT,NEAR   CPRT:NEAR
        EXTRN   ASCBN:NEAR  BNASC:NEAR
        EXTRN   DPCMP:NEAR  DPADD:NEAR  DPSUB:NEAR  DPMUL:NEAR  DPDIV:NEAR
CODE ENDS

DGROUP  GROUP       CODE, CONST, RESET
        DGROUP  GROUP       INIV. STACK DATA
CODE SEGMENT PUBLIC 'CODE'

RO Assembler  03-06-84        Page 1-2

ASSUE CS:CGROUP, DS:GROUP, SS:DGROUP, ES:EGROUP

;KEYBOARD CONSTANTS

NID     EQU     20              ;NUMBER OF IDENTIFICATION CODES
NFEE    EQU     20              ;NUMBER OF FEES
NTR     EQU     16              ;NUMBER OF TRANSACTIONS PER
                                 CUSTOMER/VENDOR
SKBFR   EQR     16              ;SIZE OF KEYBOARD BUFFER
SDBFR   EQU     16              ;SIZE OF DISOLAY BUFFER
KBDCS   EQU     300H            ;KEYBOARD COMMAND/STATUS ADDRESS
KBDCD   EQU     00DH            ;PORT A & C OUTPUT, B INPUT
KBDRS   EQU     0FBH            ;ROW 1 SELECT
KBDRM   EQU     00FH            ;READ MASK
KNKEY   EQU     24              ;NUMBER OF KEYS
KNROW   EQU     6               ;NUMBER OR ROWS
KNCOL   EQU     4               ;NUMBER OF COLUMNS
KDBNC   EQU     4               ;BEBOUNCE CONSTANT
KBYTE   EQU     1               ;BYTE ENTRY
KWORD   EQU     2               ;WORD ENTRY
KDWRD   EQU     3.              ;DWORD ENTRY
KREAL   EQU     4               ;REAL ENTRY
KALPHA  EQU     5               ;ALPHA ENTRY
KEY0    EQU     00H             ;0
KEY1    EQU     01H             ;1
```

```
KEY2      EQU     02H             :2
KEY3      EQU     03H             :3
KEY4      EQU     04H             :4
KEY5      EQU     05H             :5
KEY6      EQU     06H             :6
KEY7      EQU     07H             :7
KEY8      EQU     08H             :8
KEY9      EQU     09H             :9
KEYEN     EQU     0AH             :ENTER
KEYVD     EQU     0BH             :VOID
KEYST     EQU     0CH             :START
KEYNF     EQU     0DH             :NO FEE
KEYID     EQU     0EH             :ID
KEYMO     EQU     0FH             :MONEY ORDER
KEYTX     EQU     10H             :TRANSMIT
KEYDF     EQU     11H             :DEFINE
KEYVP     EQU     12H             :VENDOR PAYMENT
KEYTO     EQU     13H             :TOTAL
KEYLD     EQU     14H             :LOAD
KEYDY     EQU     15H             :DAY/SHIFT
KEYDS     EQU     16H             :DISPLAY
KEYBR     EQU     17H             :PRINT
KEYDATA   DB      KEYLD           :KEY CODE TABLE
          DB      KEYDY
          DB      KEYDS
          D       KEYPR
          DB      KEYTX
          DB      KEYDF
          DB      KEYBP
          DB      KEYTO
          DB      KEYST
          DB      KEYNF
          DB      KEYID
          DB      KEYMO
          DB      KEY6
          DB      KEY3
          DB      KEYEN
```

CRO Assembler 03-06-84          Page 1-3

```
          DB      KEY8
          DB      KEY5
          DB      KEY2
          DB      KEY0
          DB      KEY7
          DB      KEY4
          DB      KEY1
          DB      KEYVD
KEYJT     DW      KENT            :KEYBOARD JUMP TABLE
          DW      KVOID
          DW      KSTRT
          DW      KNFEE
          DW      KID
          DW      KMO
          DW      KTRNS
          DW      KDEFN
          DW      KVP
          DW      KTOTL
          DW      KLOAD
          DW      KSHFT
          DW      KDISP
          DW      KPRNT
:DATA ENTRY AND DISPLAY TABLES
:NUMBER OF DATA ITEMS TO BE ENTERED
:16 CHARACTER DISPLAY
:NUMBER OF POSSIBLE ENTRIES PER DATA ITEM
:NUMBER OF FIELDS
:NUMBER OF ERRONEOUS ENTRIES BEFORE RMOD LOCKS
:DISPLAY START OF ENTRY - 0=NO DISPLAY
:NUMBER OF CHARACTERS PER DISPLAY - 0=NONE ALLOWED
:TYPE OF DATA - 1=BYTE, 2=WORD, 3=DWORD, 4=REAL, 5=ALPHA
:LOWER LIMIT - 0=NO LIMIT CHECK, FFFFFFFF=CHECK AGAINST ARRAY
```

```
                IN UPPER LIMIT
    :UPPER LIMIT
    :DATA STORAGE POINTER
KSTRTN    EQU      2                   :START OF DAY KEYBOARD DATA
KSTRTD    DB       'ID              ',20,1,5

DB       14,3,1
          DD       0FFFFFFFFH,ID
          DD       CIDL
          DB       'BEG#            ',1,3,0

DB       6,3,2
          DD       0FFFFFFFFH,BSACC1
          DD       CSACC
          DB       9,6,3
          DD       0FFFFFFFFH,DBNBR1
          DD       CSNBR
          DB       16,12,1
          DD       0FFFFFFFFH,BSCHK1
          DD       CSCHK
          DD       0FFFFFFFFH,SCRTY
          DD       CSCRTY'       DB
'DIAL TELELPHOHE #',0,0,0

DB       0,0,0
          DD       0,0

DD       TRNS
          DB       'DISCONNECT RMOD ',0,0,0

DB       0,0,0
          DD       0,0

DD       0
EFNN      EQU      19                  :DEFINE KEYBOARD DATA-ENTERED BY
                                        MANAGER
EFND      DB       'SECURITY#   ',1,1,0

DB       0,5,2
          DD       0,0

DD       SCRTY
          DB       'ST          ',1,5,0

DB       3,3,2
          DD       0,0

DD       STACC
          DB       6,2,1
          DD       0,0

DD       STSTE
          DB       8,2,1
          DD       0,0

DD       STSUB
          DB       10,3,2
          DD       0,0

DD       STDIV
          DB       13,4,2
          DD       0,0

DD       STSTR
          DB       'DATE    /  /  ',1,3,0
          DD       MONTH
          DB       12,2,1
          DD       1,31
```

```
DD      DAY
DB      15,2,1
DD      0,0

DD      YEAR
DB      'TIME        :  :   ',1,3,0

DB      9,2,1
DD      0,24

DD      CHR
DB      12,2,1
DD      0,59

DD      CMIN
DB      15,2,1
DD      0,59

DD      CSEC
DB      'PHNE           ',1,1,0

DB      6,11,5
DD      0,0

DD      PHONE
DB      'ID USE         ',1,1,0

DB      16,1,1
DD      0,2

DD      USE
DB      'ID             ',20,1,0

DB      14,3,1
DD      0,255

DD      ID
DB      'FE             ',20,2,0

DB      2,3,4
DD      0,99999999

DD      FEELMT
DB      12,4,4
DB      'CST MO#        ',0,1,0
```

D Assembler 03-06-84          PAGE 1-6

```
DB      12,5,2
DD      0,0

DD      MCNTC
DB      'MCH MO#        ',0,1,0

DB      12,5,2
DD      0,0

DD      MCNTM
DB      'CST MO$        ',0,1,0

DB      8,8,4
DD      0,0

DD      MAMTC
DB      'MCH MO$        ',0,1,0

DB      8,8,4
DD      0,0
```

```
         DD      MAMTM
         DB      'VND CK#     ',0,1,0

DB      12,5,2
         DD      0,0

DD      VCNTC
         DB      'MCH CK#     ',0,1,0

DB      12,5,2
         DD      0,0

DD      VCNTM
         DB      'VND CK$     ',0,1,0

DB      8,8,4
         DD      0,0

DD      MAMTC
         DB      'MCH CK$     ',0,1,0
         DD      0,0

DD      VAMTM
```

RO Assembler 03-06-84          Page 1-7

```
         DB      'WARN # BLANKS  '0,1,0

DB      15,2,1

DD      0,0
         DB      'WARN # TRANS   '0,1,0

DB      15,2,1
         DD      0,0

DD      TRANS
         DB      'LOCK # ERRORS  '0,1,0

DB      15,2,1
         DD      0,0

DD      LOCK
KLOADN   EQU     3
KLOADD   DB      'SECURITY #     ',1,1,5

DB      0,5,2
         DD      0FFFFFFFFH,SECRTY
         DD      CSCRTY
         DB      'BEG#           ',1,3,0

DB      6,3,2
         D       0FFFFFFFFH,STACC
         DD      BSACC2
         DB      9,6,3
         DD      0,0

DD      BSNBRS2
         DB      16,1,1
         DD      0,0

DD      BSCHK2
         DB      'END#           ',1,3,0

DB      6,3,2
         DD      0FFFFFFFFH,STACC
         DD      SACC2
```

```
                DB              9,6,3
                DD              0,0
KEYBOARD MONITOR PRCEDURE

PAGE
;KEYBOARD MONITOR PROCEDURE
                PUBLIC          KEYB
KEYB            PROC            NEAR
                MOV             AL,KEYBS        ;$$$SECURITY CHECK$$$
                XDR             AL,AL
                JNZ             KEYBO           ;$$$KEYBOARD LOCKED$$$
                CALL            KEYSC           ;SCAN KEYBOARD FOR KEY
                                                 DEPRESSED
                CMP             AL,KNKEY
                JL              KEYB1
KEYB0:          RET                             ;NO KEY OR NON-EXIST KEY
KEYB1:          XDR             CX,CX
                CMP             AL,10
                JL              KNMBR           ;NUMBER 0-9
                XCHG            KCMD,AL         ;ROTATE COMMANDS
                MOV             KPCMD,AL        ;SAVE PREVIOUS COMMAND
                SUB             AL,10
                MOV             CL,AL
                PUSH            CX              ;SAVE JUMP TABLE INDEX
                MOV             CL,KCNT         ;NUMBER OF DIGITS ALLOWED
                CMP             KNDG,0          ;NUMBER OF DIGITS ENTERED
                JZ              KEYB4           ;NO DATA ENTERED
                MOV             DI,KPTR         ;OFFSET OF DATA STORAGE IF ANY
                MOV             SI,OFSET KBIN   ;TEMPORARY BINARY STORAGE
                MOV             BX,OFFSET SCRTCH
                MOV             AX,KBPTR        :OFFSET OF DATA ENTERED
                CMP             KTPE,KALPHA     ;CHECK DATA TYPE
                JE              KEYB2           ;ALPHA
                PUSH            AX              ;SAVE KEYBOARD BUFFER ADDRESS
                PUSH            SI
                PUSH            BX
                PUSH            CX
                CALL            ASCBN           ;CONVERT TO BINARY
                PUSH            SI              ;POINTER TO CONVERTED BINARY
                                                 NUMBER
                MOV             AX,OFFSET KLLMT
                PUSH            AX              ;LOWER LIMIT
                CALL            DRCMP           ;COMPARE
                SAL             AX,1
                JC              KEYB5           ;ERROR-NUMBER/LOWER LIMIT
                MOV             AX,OFFSET KULMT
                PUSH            AX              ;UPPER LIMIT
                PUSH            SI              ;CONVERTED BINARY NUMBER
                CALL            DPCMP           ;COMPARE
                SAL             AX,1
                JC              KEYB5           ;ERROR-UPPER LIMIT/NUMBER
                MOV             CL,KTPE
                CMP             CL,KDWRD
                JNE             KEYB2
                INC             SX              ;ADJUST DWORD COUNT
KEYB2:          MOV             AX,DS           ;TRANSFER DATA ENTERED
                CMP             KPTR+2,AX
                JE              KEYB3           ;DESTINATION=EE PROM
                MOV             BX,KPTR
KEYB2A          LODSB
                CALL            WEEPRM          ;DESTINATION=EE PROM
                INC             BX
                LOOP            KEYB2A
KEBY3:          OR              AX,AX
                JE              KEYB4           ;NO TRANSFER, LEAVE IN KBIN
REP             MOVSB
```

KEYBOARD MONITOR PROCEDURE

```
KEYB4:          POP             BX              ;RETRIEVE JUMP TABLE INDEX
                SHL             BX,1            ;COMPUTE JUMP ENTRY
```

```
              JMP      KEYJT [BX]         ;PROCESS KEY
KEYB5:        POP      BX
              CALL     KERR
              RET
KNMBR:        ADD      AL,30H             ;CONVERT TO ASCII
              CLD
              MOV      SI,OFFSET KBFR+1
              MOV      DI,OFFSET KBFRR
     MOV      CX,SKBFR-1
     REP      MOVSB                       ;ROTATE KBFR TO LEFT
              STOSB                       ;ADD NEW CHARACTER TO RIGHT
              INC      KNDG               ;DIGIT COUNT
              CMP      KDSP,0             ;CHECK FOR DISPLAY
              JZ       KNMBR3             ;NO DISPLAY ALLOWED
              MOV      DI,OFFSET DBFR-1
              XOR      CH,CH
              MOV      CL,KDSP
              ADD      DI,CX
              MOV      SI,OFFSET KBFR+SKBFR
              MOV      CL,KCNT
              SUB      SI,CX
              MOV      KBPTR,SI           ;SAVE KBFR OFFSET
              PUSH     DI                 ;SAVE START OF DISPLAY
              PUSH     CX                 ;SAVE NUMBER OF CHARACTERS IN
                                           DISPLAY
              MOV      BL,KTPE            ;TUPE OF ENTRY BEING PROCESSED
              CMP      BL,KREAL
              JNE      KNMBR1
              POP      CX
              INC      CX                 ;ADD DECIMAL POINT TO COUNT
              PUSH     CX
              SUB      CX,3               ;REAL ENTRY
KNMBR1:
     REP      MOVSB                       ;MOVE KBFR TO DBFR
              CMP      BL,KREAL           ;CHECK FOR REAL ENTRY
              JNE      KNMBR2
              MOV      AL,'.'             ;REAL ENTRY
              STOSB
              MOV      CL,2               ;MOVE FRACTION
     REP      MOVSB
KNMBR2:       MOV      AK,DKSP            ;START OF MESSAGE (1-16)
              MOV      AL,05H             ;CURSOR LINE, ON
              PUSH     AX
              CALL     DISP
KNMBR3:       RET
KENTR:        NGP                         ;ENTER KEY - $$$NO PROGRAM$$$
KVOID:        MOV      AH,MOVP            ;VOID KEY
              MOV      AL,TOTS            ;TOTAL STATUS
              CMP      AH,1
              JE       KOID1              ;MONEY ORDER VOID
              CMP      AH,2
              JE       KVPOID2            ;VENDOR PAYMENT VOID
              CALL     KERR               ;ERROR-CLEAR ENTRY & BEEP
              RET
KVOID2:       MOV      SI,OFFSET CVCNT    :VENDOR PAYMENT VOID
              MOV      DI,OFFSET CVAMT
KVOID3:       BX,8X                       :CAMT,CFEE INDEX
```

KEYBOARD MONITOR PROCEDURE

```
              MOV      CX,CCNT            :# OF MO/VP ENTERED
              CMP      AL,0
              JNE      KVOID4             :TOTAL KEY DEPRESSED, VOID
                                           ALL
              MOV      AL,4               :VOID LAST ENTRY
              DEC      CL
              MUL      CL
              MOV      BX,AX
              MOV      CL,1
KVOID4:       PUSH     CX                 :# OF ENTRIES TO BE VOIDED
KVOID5:       DEC      CCN                :REDUCE COUNT
```

```
              DEC     CVCNT
              CMP     TOTS,1
              JNZ     KVOID6
              DEC     CTCNT           :REDUCE TOTAL TRANSACTIONS
KVOID6:       LOOP    KVOID5
              POP     CX
              PUSH    CX
              PUSH    DI              :SAVE CMAMT/CVAMT OFFSET
KVOID7:       MOV     SI,OFFSET CAMT
              ADD     SI,BX
              MOV     DI,OFFSET CTOT
              PUSH    SI
              PUSH    DI
              CALL    DPSUB           :CTOT=CTOT-MO/VP
              CMP     MOVP,1
              JNE     KVOID9
              PUSH    SI              :REDUCE FEES
              CMP     TOTS,0
              JE      KVOID8
              MOV     SI,OFFSET CFEE  :SUBTRACT FEE FROM CTOT
              ADD     SI,CX
              PUSH    SI
              PUSH    DI
              CALL    DPSUB           :CTOT=CTOT-CFEE
KVOID8:       XOR     AX,AX           :ZERO FEE
              MOV     [SI],AX
              MOV     [SI+2],AX
              POP     SI
KVOID9:       POP     DI
              POP     SI
              PUSH    DI
              CALL    DPSBU           :CMAMT/CVAMT=CMAMT/CVAMT-MO/VP
              PUSH    DI
              CMP     TOTS,1
              JNZ     KVOID10
              MOV     DI,OFFSET CTAMT :REDUCE TOTAL AMOUNT
              PUSH    SI
              PUSH    DI
              CALL    DPSUB
KVOID10:      POP     DI
              XOR     AX,AX
              MOV     [SI],AX         :ZERO CAMT
              MOV     [SI+2],AX
              INC     BX
              INC     BX
              JZ      KSTRT1          :SECOND START KEY
              CALL    PWRON           :POWER ON
              RET

RO Assembler 03-06-84                 Page 1-12

KEYBOARD MONITOR PROCEDURE

KSTRT1:       MOV     AL,KSTRTN       :START DATA
              MOV     SI,OFFSET KSTRTD
              CALL    KINIT           :INITIALIZE KEYBOARD AND
                                       DISPLAY VARIABLES
              RET
KNFEE:        MOV     FEEC,1          :NO FEE KEY - FECC=1
              RET
KID:          MOV     SI,OFFSET KBIN  :ID KEY
              LODSB
              MOV     CID,AL
              PUSH    ES              :CHECK FOR VALID ID
              MOV     AX,EPRM
              MOV     DI,OFFSET ID    :EEPROM ADDRESS
              MOV     CX,NID          :NUMBER OF IDS
              REPNE   SCASB
              POP     ES
              JB      KID1
              MOV     CID,0           :ZERO CURRENT ID
              CALL    KERR            :ERROR-WIPE OUT ENTRY AND
                                       BEEP
```

```
KID1:   RET                             ;MATCH FOUND
KMO:    MOV     SI,OFFSET KBIN          ;MONEY ORDER KEY
        MOV     DI,OFFSET CTOT
        PUSH    SI
        PUSH    DI
        CALL    DPADD                   ;CTOT=CMAMT+AMT ENTERED
        MOV     DI,OFFSET CMAMT
        PUSH    SI
        PUSH    DI
        CALL    DPADD                   ;CMAMT=CMAMT+AMT ENTERED
        PUSH    ES
        MOV     AX,EPRM
        MOV     ES,AX
        MOV     DI,OFFSET MONTC         ;EEPROM ADDRESS
        MOV     AX,CCNT
        CMP     AX,NTR                  ;CHECK NUMBERS
        JGE     KMOE                    ;MONEY ORDERS EXCEEDED PER
                                        SYSTEM
        CMP     AX,ES:WORD PTR[DI]
        JGE     KMOE                    ;MONEY ORDERS EXCEEDED PER
                                        MACHINE
        MOV     SI,OFFSET CTOT          ;CHECK AMOUNT PER CUSTOMER
        ADD     DI,2
        PUSH    SI
        PUSH    DI
        CALL    DPCMP                   ;COMPARE TWO DOUBLE
                                        PRECISION NUMBERS
        CMP     AL,1
        JE      KMO4                    ;CTOT MAX AMT PER CUSTOMER
        MOV     SI,OFFSET CMAMT         ;CHEC AMOUNTS PER MACHINE
        ADD     DI,4
        PUSH    SI
        PUSH    DI
        CALL    DPCMP                   ;COMPARE TWO DOUBLE
                                        PRECISION NUMBERS
        CMP     AL,1
KMOE:   POP     ES                      ;KEYBOARD ERROR
        CALL    KERR                    ;ERROR - CLEAR ENTRY & BEEP

RO Assembler 03-06-84                   Page 1-13

KEYBOARD MONITOR PROCEDURE

KMO0:   MOV     MOVP,1                  ;MO/VP INDICATOR
        INC     CONT
        INC     CMONT
        MOV     AL,4
        MUL     BL
        MOV     BX,AX                   ;CAMT & CFEE INDEX
        MOV     AX,KBIN                 ;LOW BYTES OF MO
        MOV     CAMT[BX],AX
        MOV     AX,KBIN+2               ;HIGH BYTES OF MO
        MOV     CAMT[BX],AX
        MOV     AL,FEEC                 ;CHECK IF FEE IS TO BE
                                        COMPUTED
        CMP     AL,0
        JE      KMO3                    ;NO FEE
        PUSH    ES
        MOV     AX,EPRM
        MOV     ES,AX
        MOV     SI,OFFSET KBIN          ;FIND FEE
        MOV     DI,OFFSET FEELMT-9
        MOV     CX,NFEE
KMO1:   ADD     DI,B                    ;$$$ORDER CHANGED$$$
        PUSH    SI
        PSUH    DI                      ;$$$WRONG SEGMENT$$$
        CALL    DPCMP                   ;COMPARE TWO DOUBLE
                                        PRECISION NUMBERS
        CMP     AX,1
        JNE     KMO2                    ;FEE FOUND-MONEY ORDER
                                        $<=$BREAKPOINT
```

```
                LOCP    KMO1                    ;NEXT FEE
KNO2:           ADD     DI,4                    ;FEE ADDRESS
                MOV     AX,ES:WORD PTR[DI]
                MOV     CFEE[BX],AX
                ADD     DI,2
                MOV     AX,ES:WORD PTR[DI]
                MOV     CFEE+2OBX1,AX
                POP     ES
KMO3:           RET
KMO4:           POP     ES                      ;AMOUNTS EXCEEDED-SUBTRACT
                                                LAST AMOUNTS
                MOV     SI,OFFSET KBIN
                MOV     DI,OFFSET CTOT
                PUSH    SI
                PUSH    DI
                PUSH    SI
                CALL    DPSUB                   ;CTOT=CMAMT=-AMT ENTERED
                PUSH    ES
                CALL    DPSUB                   ;CMAMT=CMAMT-AMT ENTERED
                PUSH    ES
                JMP     KMOE                    ;ERROR
KTRNS:          MOV     AL,KTRNSN               ;TRANSMIT KEY
                MOV     SI,OFFSET KTRNSD
                CALL    KINIT                   ;INITIALIZE KEYBOARD &
                                                DISPLAY VARIABLES
                RET
KDEFN:          MOV     AL,KDEFNN               ;DEFINE KEY
                MOV     SI,OFFSET KDEFND
                CAL     KINIT                   ;INITIALIZE KEYBOARD &
                                                DISPLAY VARIABLES
                MOV     DI,OFFSET CTOT          ;ZERO CURRENT TOTAL
                XDR     AX,AX
                STOSW
```

RO Assembler 03-06-84            Page 1-14

KEYBOARD MONITOR PROCEDURE

```
                STOSW
                MOV     AL,MOVP
                JE      KTOTL6                  ;DISPLAY OR PRINT TOTALS
                CMP     AL,2
                JE      KTOTL3                  ;VENDOR PAYMENT TOTAL
                CMP     AL,1
                JE      KTOTL1                  ;MONEY ORDER TOTAL
                CALL    KERR
                RET
KTOTL1:         MOV     CX,CONT                 ;MONEY ORDER TOTAL
                MOV     SI,OFFSET CFEE-4
                MOV     DI,OFFSET CTOT
KTOTL2:         ADD     SI,4                    ;FEE ADDRESS
                PUSH    SI
                PUSH    DI
                CALL    DPADD                   ;ADD UP ALL FEES
                LOOP    KTOTL2
KTOTL3:         MOV     CX,CCNT                 ;SUM TOTAL TRANSACTIONS
                AD      CTCNT,CX
                MOV     SI,OFFSET CAMT-4
                MOV     DI,OFFSET CTOT
KTOTL4:         ADD     SI,4
                PUSH    SI
                PUSH    DI
                CALL    DPADD
                LOOP    KTOTL4
                PUSH    DI
                MOV     SI,OFFSET CTAMT
                PUSH    SI
                CALL    DPADD                   ;SUM MACHINE TOTAL
                MOV     SI,OFFSET MOTMSG        ;MO TOT
                CMP     MOVP,1
                JE      KTOTL5
                MOV     SI,OFFSET VPTMSG        ;VP TOT
KTOTL5:         MOV     DI,OFFSET DBFR
```

```
            PUSH    DI                      ;DBER ADDRESS FOR DISPLAY
            MOV     CX,7
REP         MOVS    ES:BYTE PTR[DI],CS:[SI]
            MOV     SI,OFFSET CTOT          ;CONVERT TO ASCII & DISPLAY
            MOV     CX,OFFSET SCRTCH
            MOV     AH,9
            MOV     AL,KREAL
            PUSH    SI
            PUSH    DI
            PUSH    CX
            PUSH    AX
            CALL    BNASC                   ;CONVERT TO ASCII
            MOV     AX,SDBFR
            PUSH    AX
            MOV     AX,120H                 ;BLINKING DISPLAY, NO CURSOR
            PUSH    AX
            CALL    DISP                    ;DISPLAY
            RET
KTOTL6:     NOR                             ;TOTAL DISPLAY/REPORTS-$$$NO PROGRAM$$$
            RET
KSHFT:      MOV     SHFT,1                  ;DAY/SHIFT KEY
            RET

RO Assembler 03-06-84              Page 1-15

KEYBOARD MONITOR PROCEDURE

KDISP:      MOV     DSPR,1                  ;DISPLAY KEY - DSPR=1
            RET
KPRNT:      MOV     DSPR,2                  ;PRINT KEY - DSPR=2
            MOV     AL,MOVP
            CMP     AL,0
            JNZ     KPRNT1                  ;MO/VP PRINT
            RET
KPRNT1:     MOV     AL,CKPRS                ;$$$ SECURITY CHECK $$$
            XOR     AL,AL
            JZ      KPRNT2                  ;OK TO PRINT MONEY
                                            ORDERS/VENDOR PAYMENTS
            RET                             ;PRINTER DISABLED - IGNORE
                                            PRINT COMMAND
KPRNT2:     NOP                             ;PRINT CHECK - $$$ NO PROGRAM
                                            $$$
KEYB        ENDP
SUBTTL              KEYBOARD INITIALIZATION PROCEDURE
PAGE 66,132
NAME                RMOD_PRINT

;    *************************************************************
;    ***  PRINTER DRIVER FOR RMOD. THIS PROGRAM ACCEPTS STRING  ***
;    ***  DATA AND TRANSFORMS IT INTO A LIST OF "CELL SPECS"    ***
;    ***  WHICH ARE SORTED AND PROCESSED TO GENERATE A LINE AT A ***
;    ***  TIME OF PIXEL DATA TO DRIVE THE FOUR PRINT SOLENOIDS  ***
;    ***  OF A _____ DOT MATRIX PRINTER                      ***
;    ***  THE ALGORITHM IS EXPLAINED IN A SEPARATE DOCUMENT     ***
;    ***  TITLED "_____"                                     ***
;    *************************************************************

STACK           SEGMENT     PARA    STACK   'STACK'

STACK_BOTTOM    LABEL       WORD
                ORG         OFFSET $+01FEH
STACK_TOP       LABEL       WORD
STACK           ENDS

DATA            SEGMENT     PARA    MEMORY  'DATA'

NEXT_CELL       LABEL       WORD
                ORG         OFFSET $+2
```

```
TOTAL_CELLS        LABEL      WORD
                   ORG        OFFSET $+2
XCOORD             LABEL      WORD
                   ORG        OFFSET $+2
YCOORD             LABEL      WORD
                   ORG        OFFSET $+2
FONT               LABEL      BYTE
                   ORG        OFFSET $+1
DIRECT             LABEL      BYTE
                   ORG        OFFSET $+1
WDTH               LABEL      BYTE
                   ORG        OFFSET $+1
HEIGHT             LABEL      BYTE
                   ORG        OFFSET $+1
HSPACE             LABEL      BYTE
                   ORG        OFFSET $+1
VSPACE             LABEL      BYTE
                   ORG        OFFSET $+1
IPT_OFFS           LABEL      WORD
                   ORG        OFFSET $+2
HORIZ              LABEL      WORD
                   ORG        OFFSET $+2
VERT               LABEL      WORD
                   ORG        OFFSET $+2
CSPECS_START       LABEL      WORD
                   ORG        OFFSET $+2
ACTIVE_CELL_TABLE  LABEL      WORD
                   ORG        OFFSET $+(2*3*65)
ACTIVE_LIST        LABEL      WORD
                   ORG        OFFSET $+2
THIS_ENT           LABEL      WORD
                   ORG        OFFSET $+2
NEXT_ENT           LABEL      WORD
                   ORG        OFFSET $+2
FREE_LIST          LABEL      WORD
                   ORG        OFFSET $+2
BACK               LABEL      WORD
                   ORG        OFFSET $+2
FWD                LABEL      WORD
                   ORG        OFFSET $+2
NUMBER_ACTIVE      LABEL      BYTE
                   ORG        OFFSET $+1
SWAPPED            LABEL      BYTE
                   ORG        OFFSET $+1

;       THIS IS THE OUTPUT LINE BUFFER FOR SOLENOID DATA

BUFF               LABEL      BYTE           ; ROOM FOR 16 BYTES
                   ORG        OFFSET $+16    ; LAST 2 FOR OVERFLOW

BIT                LABEL      BYTE           ; HOLDS POSITION IN SCANLINE
                   ORG        OFFSET $+1
SCANLINE           LABEL      WORD           ; HOLDS CURRENT SCANLINE
                   ORG        OFFSET $+2
PR_SHADOW          LABEL      BYTE
                   ORG        OFFSET $+1
SOL                LABEL      BYTE           ; HOLDS VAL OF CURRENT
                   ORG        OFFSET $+1     ; SOLENOID
INSERTED           LABEL      WORD           ; NUMBER OF CSPECS WHICH
                   ORG        OFFSET $+2     ; HAVE BEEN MADE ACTIVE
NXT2CHK            LABEL      WORD           ; OFFSET OF NXT CSPEC
                   ORG        OFFSET $+2     ; TO EXAMINE
```

```
;   FOR SIMULATION PURPOSES THIS VARIABLE WILL REPRESENT
;   THE IO PORT WHICH CONTROLS THE PRINTER THIS WILL HAVE
;   TO BE CHANGED TO AN I/O INSTRUCTION WHICH WRITES TO AN
;   IO SEGMENT ADDRESS

PRINT_PORT              LABEL           BYTE
                        ORG             OFFSET $+1

;   TEST DATA- TO BE REMOVED AFTER DEBUGGING IS DONE
;   THIS SPECIFIES 3 STRINGS TO BE PRINTED

STRING_LIST             DB              3                       ;3 STRING DESCRIPTORS
                        DW              OFFSET STRING1
                        DW              OFFSET STRING2
                        DW              OFFSET STRING3

STRING1                 DW              0                       ;X COORDINATE
                        DW              0                       ;Y COORDINATE
                        DB              AFONT                   ;STANDARD FONT
                        DB              DOWN                    ;CHECK ORIENTATION
                        DB              3                       ;CHARACTER COUNT
                        DB              'ABC'                   ;THE STRING

STRING2                 DW              0                       ;X COORDINATE
                        DW              0                       ;Y COORDINATE
                        DB              AFONT                   ;STANDARD FONT
                        DB              RIGHT                   ;RECEIPT ORIENTATION
                        DB              4                       ;NUMBER OF CHARS
                        DB              'TX_J'                  ;THE STRING

STRING3                 DW              25                      ;XCOORDINATE
                        DW              10                      ;Y COORDINATE
                        DB              AFONT                   ;STANDARD FONT
                        DB              LEFT                    ;BACKWARDS DIRECTION
                        DB              2                       ;CHAR COUNT
                        DB              'HI'                    ;THIRD STRING

FREE_SPACE              LABEL           WORD                    ;SHOULD BE ENOUGH SPACE
                        ORG             $+(50*8)                ;FOR 50 CELL SPECS
END_DATA                LABEL           WORD
DATA                    ENDS

;************************************************************************
;EQUATES
;************************************************************************

MAX_ACTIVE_CELLS        EQU             64
SIZE_OF_ACT             EQU             65
CSPEC_SIZE_IN_BYTES     EQU             8

RIGHT                   EQU             0
LEFT                    EQU             1
UP                      EQU             2
DOWN                    EQU             3

;OFFSETS WITHIN AN ACTIVE CELL TABLE ENTRY.

ACT_CSPEC_INDEX         EQU             0
ACT_BACK_PTR            EQU             2
ACT_FWD_PTR             EQU             4
```

;OFFSETS WITHIN A CELL SPEC

```
CSPEC_SCANLINE      EQU     0
CSPEC_FMEMOFFS      EQU     2
CSPEC_WIDTH         EQU     4
CSPEC_HEIGHT        EQU     5
CSPEC_XBYTEOFFS     EQU     6
CSPEC_XBITOFFS      EQU     7
```

;OFFSETS WITHIN A FONT DESCRIPTOR

```
FDESC_WIDTH         EQU     0
FDESC_HEIGHT        EQU     1
FDESC_HSPACE        EQU     2
FDESC_VSPACE        EQU     3
FDESC_IPTOFFS       EQU     4
```

;OFFSETS WITHIN A STRING DESCRIPTOR

```
STDESC_XCOORD       EQU     0
STDESC_YCOORD       EQU     2
STDESC_FONT         EQU     4
STDESC_DIRECT       EQU     5
STDESC_COUNT        EQU     6
STDESC_CHARS        EQU     7

MAX_SCANS           EQU     700     ;NUM SCANLINES PER MONEY ORDR
BITS_PER_SCAN       EQU     240     ;WIDTH OF ONE SCANLINE IN DOTS
```

;EQUATES USED WITH PRINT SHADOW REGISTER    PR_SHADOW

```
SOL1                EQU     01H
SOL2                EQU     02H
SOL3                EQU     04H
SOL4                EQU     08H
NOT_SOLENOIDS       EQU     0F0H
MTRORV              EQU     010H
NOT_MTRORV          EQU     0EFH
MTRSTP              EQU     020H
NOT_MTRSTP          EQU     0DFH
CLAMP_ON            EQU     080H
CLAMP_OFF           EQU     07FH

AFONT               EQU     0
BFONT               EQU     1

CODE                SEGMENT     WORD    PUBLIC 'CODE'

ASSUME      CS:CODE
            ASSUME      DS:DATA
            ASSUME      SS:STACK
```

;****************************************************************
; DRIVER ROUTINE :   THIS IS FOR DEBUGGING-SHOULD COME OUT LATER
;****************************************************************

```
TEST_STARTS:        MOV     AX,DATA
                    MOV     DS,AX

MOV     AX,STACK        ;SET UP STACK SEG
                    MOV     SS,AX
                    MOV     SP,OFFSET STACK_TOP ;SET UP STK PTR
```

```
                        MOV     DX,OFFSET FREE_SPACE
                        MOV     BX,OFFSET STRING_LIST
                        CALL    PRNTR
TEST_DONE:              JMP     TEST_DONE
```

;****************************************************************************
;END OF DEBUGGING CODE
;****************************************************************************

;****************************************************************************
;
;   THIS IS THE MAIN ENTRY POINT FOR THE WHOLE PRINTER DRIVER
;   PRNTR EXPECTS TWO PARAMETERS:
;
;           1. THE OFFSET OF THE STRING LIST TABLE SHOULD BE IN BX reg
;
;           2. THE OFFSET OF UNRESTRICTED WORKSPACE ABOVE ALL STRINGS
;              AND OTHER DATA SHOULD BE IN DX reg
;
;****************************************************************************

```
PRNTR:          ;       PUSHA   ***** 80186 INST. ;SAVE ALL REGISTERS
                                        ; REPLACED BY THE FOLLOWING
                        PUSH    AX
                        PUSH    BX
                        PUSH    CX
                        PUSH    DX
                        PUSH    DS
                        PUSH    ES
                        PUSH    SS
                        PUSH    DI
                        PUSH    SI
                        PUSH    BP

MOV     AX,DATA         ;SET UP SEGMENT REGISTER
                        MOV     DS,AX
```

;   GET THE OFFSET OF UNRESTRICTED WORKSPACE IN WHICH WE MAY
;   BUILD THE TABLES. CALLER SHOULD SUPPLY THIS IN DX REGISTER

```
                        MOV     NEXT_CELL,DX    ;OFFSET OF FREE AREA IN DATA SEGMENT
                                                ; FOR TABLES
                        MOV     TOTAL_CELLS,0   ;COUNTER FOR CELL SPECS
                        MOV     CSPECS_START,DX ;SAVE ORIGIN OF CELL SPEC TABLE.

SUB     CX,CX
```

;   BX HOLDS OFFSET IN DATA SEGMENT OF STRING LIST

```
                        MOV     CL,[BX]         ;GET NUMBER OF STRINGS TO PROCESS
                        INC     BX              ;BX HOLDS OFFSET OF WORD HOLDING
                                                ;OFFSET OF FIRST STRING IN LIST
;   CHECK FOR ZERO STRINGS
                        CMP     CL,0
                        JG      DO_A_STRING
                        JMP     LISTS_DONE
```

;****************************************************************************

```
; PROCESS EACH STRING IN THE STRING LIST. BX HOLDS THE OFFSET OF THE FIRST
; ENTRY IN THE STRING LIST TABLE. CL HOLDS THE NUMBER OF STRINGS TO PROCESS
; CSPECS_START HOLDS THE OFFSET OF THE AREA WHERE THE CELL SPECS WILL BE
; BUILT AND SORTED.
;*****************************************************************

DO_A_STRING:        MOV         DX,[BX]         ;DX HOLDS OFFSET OF NEXT STRING DESC
                    INC         BX              ;MAKE BX POINT TO WORD HOLDING
                    INC         BX              ;OFFSET OF NEXT STRING DESC AND
                    PUSH        BX              ;SAVE ON STACK FOR NEXT LOOP

;       NOW LOAD PARAMETERS FOR CURRENT STRING

MOV         BX,DX           ;OFFSET OF CURRENT STRING DESC
                    MOV         AX,[BX+STDESC_XCOORD]
                    MOV         XCOORD,AX

MOV         AX,[BX+STDESC_YCOORD]
                    MOV         YCOORD,AX

MOV         AL,[BX+STDESC_FONT]
                    MOV         FONT,AL

MOV         AL,[BX+STDESC_DIRECT]
                    MOV         DIRECT,AL

PUSH        BX              ;SAVE WHILE DOING NEXT

SUB         BX,BX           ;MULTIPLY FONT BY 6
                    MOV         BL,FONT         ;TO MAKE IT AN INDEX
                    SHL         BX,1            ;INTO THE FONT_SPEC_TABLE
                    MOV         DX,BX
                    SHL         BX,1
                    ADD         BX,DX

;NOW GET THE PARAMETERS FOR THE FONT REQUESTED

ADD         BX,OFFSET FONT_SPEC_TABLE

MOV         AL,CS:[BX+FDESC_WIDTH]
                    MOV         WDTH,AL         ; WIDTH IN BYTES

MOV         AL,CS:[BX+FDESC_HEIGHT]
                    MOV         HEIGHT,AL       ; HEIGHT IN BITS

MOV         AL,CS:[BX+FDESC_HSPACE]
                    MOV         HSPACE,AL

MOV         AL,CS:[BX+FDESC_VSPACE]
                    MOV         VSPACE,AL

MOV         AX,CS:[BX+FDESC_IPTOFFS]
                    MOV         IPT_OFFS,AX

;NOW INITIALIZE CUMULATIVE POSITIONERS

MOV         HORIZ,0
                    MOV         VERT,0

POP         BX ; RESTORE OFFSET OF CURRENT STRING DESCRIPTOR
                    PUSH        CX ; SAVE STRING COUNTER

;SET UP REGISTERS TO LOOP THROUGH CHARACTERS OF CURRENT STRING
```

```
                MOV     SI,NEXT_CELL
                ADD     BX,STDESC_COUNT     ;BX IS OFFSET OF CHARACTER COUNT
                SUB     CH,CH
                MOV     CL,[BX]             ;LOOP COUNT = NUMBER OF CHARS

DO_A_CHAR:      INC     BX                  ;POINT TO CURRENT CHAR
                SUB     AX,AX
                MOV     AL,[BX]             ;GET THE CHAR
                PUSH    BX                  ;SAVE PTR FOR NEXT LOOP
                SHL     AX,1
                ADD     AX,IPT_OFFS         ;POINT TO IPT ENTRY FOR CHAR
                MOV     BX,AX
                MOV     AX,CS:[BX]          ;GET FONT MEM OFFSET FOR CHAR

;NOW BUILD THE CELL SPEC POINTED TO BY SI REG

MOV     [SI+CSPEC_FMEMOFFS],AX   ;FMEM OFFSET

MOV     AX,YCOORD
                ADD     AX,VERT
                MOV     [SI+CSPEC_SCANLINE],AX   ;CHAR ORIGIN SCANLINE

MOV     AX,XCOORD
                ADD     AX,HORIZ
                MOV     DX,AX
                AND     AX,0007H
                MOV     [SI+CSPEC_XBITOFFS],AL   ;CHAR ORIGIN BIT REMAINDER

SHR     DX,1
                SHR     DX,1
                SHR     DX,1
                MOV     [SI+CSPEC_XBYTEOFFS],DL  ;CHAR ORIGIN MOD BYTE

MOV     AL,WDTH
                MOV     [SI+CSPEC_WIDTH],AL      ;CHAR WIDTH IN BYTES

MOV     AL,HEIGHT
                MOV     [SI+CSPEC_HEIGHT],AL     ;CHAR HEIGHT IN BITS

;**************************************************************
; NOW CHECK DIRECTION TO COMPUTE CUMULATIVE POSITIONERS FOR NEXT
; CHARACTER THE DRAWING SHOWS THE PRINT ORIENTATIONS
;**************************************************************

;**************************************************************
;
;       +----------------------------------------+
;       :                                        :
;       :     CHAR WIDTH IN BYTES                :
;       :     <------------------>               :
;       +----------------------+                 :
;       : ############         : :               :
;       : ##############       : :               :
;       :        ###  ######   : : CHARACTER     :
;       :        ###  ######   : : HEIGHT IN     :
;       : ###################  : : BITS          :
;       : ##############       : :               :
;       :                      : :               :
;       +----------------------+ v               :
;       :                                        :
;       <---------------------------->  ^        :
;       :   HORIZONTAL    X-AXIS       :         :
;       :                              :         :
;       :        UP               VERTICAL       :
```

```
;                              Y-AXIS
;              LEFT -----+----- RIGHT            v
;
;                        DOWN
;
;         +------------------------------------------+
;         |                                          |
;         |              PRINTER                     |
;         |                                          |
;         +------------------------------------------+
;
;
;       NORMAL ORIENTATION FOR CHECK PRINTING IS "DOWN"
;
;       NORMAL ORIENTATION FOR RECEIPTS WOULD BE "RIGHT"
;
;
;                         #####...   ^  ^
;  FONT0:                 ..#..#..   :  :
;                         ..#..#..   5  :
;  Letter "A"             ..#..#..   :  7   CHAR WIDTH IN BYTES   = 1
;                         #####...   v  :   CHAR HEIGHT IN BITS   = 5
;                                       :   HORIZ SPACING IN BITS = 10
;                                       v   VERT SPACING IN BITS  = 7
;                         (------)
;                          1 BYTE
;
;                         (-- 10 --)
;
;***********************************************************************
TRY_RIGHT:       CMP       DIRECT,RIGHT    ;NORMAL, SO TRY THIS FIRST TO SAVE TIME
                 JNE       TRY_UP          ;NOT RIGHT- GO ON
DO_RIGHT:        MOV       AL,HSPACE       ;NORMAL ORIENTATION ON A RECEIPT
                 ADD       HORIZ,AX        ;NEXT CHAR IN THIS STRING WILL BE PLACED
                 JMP       CSPEC_DONE      ;THIS CHARACTER'S HORIZONTAL SPACING
                                           ;TO THE RIGHT OF THIS CAHRACTER
TRY_UP:          CMP       DIRECT,UP
                 JNE       TRY_LEFT
DO_UP:           MOV       AL,VSPACE       ;NEXT CHAR WILL BE PLACED THIS
                 SUB       VERT,AX         ;CHARS VERTICAL SPACING ABOVE
                 JMP       CSPEC_DONE      ;THIS CHARACTER TRY_LEFT:        CMP       DIRECT,LEFT     ;UPSIDE DOWN & BACKWARDS PRINTING
                 JNE       DO_DOWN
DO_LEFT:         MOV       AL,HSPACE       ;NEXT CHAR WILL BE PLACED THIS
                 SUB       HORIZ,AX        ;CHAR'S HORIXONTAL SPACING TO THE
                 JMP       CSPEC_DONE      ;LEFT OF THIS CHARACTER DO_DOWN:         MOV       AL,VSPACE       ;NEXT CHAR WILL BE PLACED THIS
                 ADD       VERT,AX         ; CHAR'S VERTICAL SPACING BELOW
                                           ;THIS CHARACTER. NORMAL
                                           ; ORIENTATION FOR CHECK CSPEC_DONE:      ADD       SI,CSPEC_SIZE_IN_BYTES
                 INC       TOTAL_CELLS
                 POP       BX              ;RESTORE OFFSET OF
                 DEC       CX              ;THIS CHAR IN
                 JZ        STRING_DONE     ;STRING DESCRIPTOR
                 JMP       DO_A_CHAR

STRING_DONE:     POP       CX              ;RESTORE STRING LOOP CTR
```

```
                    POP     BX              ;RESTORE OFFSET OF
                    MOV     NEXT_CELL,SI    ;SAVE THE OFFSET
                    DEC     CX              ;NEXT SLOT IN STRING
                    JZ      SORT_CSPECS     ;TABLE
                    JMP     DO_A_STRING

;****************************************************************
; IN-PLACE BUBBLE SORT OF CSPEC LIST INTO ASCENDING ORDER BASED ON
; CONTENTS OF 1ST WORD IN EACH CELL SPEC
;****************************************************************

SORT_CSPECS:        MOV     CX,TOTAL_CELLS
                    DEC     CX              ;OUTER LOOP IS DONE n - 1 TIMES
I_LOOP:             PUSH    CX              ;SAVE OUTER LOOP COUNTER

MOV     BX,CSPECS_START ;BEGINNING OF TABLE TO SORT
                    MOV     SWAPPED,0       ;SET FLAG CLEAR FOR NEXT INNER LOOP
                    MOV     CX,TOTAL_CELLS  ;INNER LOOP IS DONE n - 2
                    SUB     CX,2            ;TIMES
J_LOOP:             PUSH    CX              ;SAVE INNER LOOP COUNTER
                    MOV     AX,[BX]         ;COMPARE ACT_CSPEC_INDICES FOR
                    CMP     AX,[BX+8]       ;TWO ADJACENT CELLS. IF OUT OF
                    JNG     NO_SWAP         ;ORDER, THEN SWAP THEIR CONTENTS
SWAP:               PUSH    CX              ;SAVE INNER LOOP COUNTER
                    MOV     CX,CSPEC_SIZE_IN_BYTES/2  ;LOOP HERE ONCE FOR EACH
                                            ;WORD IN A CELL SPEC
SWAP_LOOP:          MOV     AX,[BX]         ;GET THE WORDS TO SWAP
                    MOV     DX,[BX+8]
                    MOV     [BX],DX         ;PUT THEM BACK IN SWAPPED
                    MOV     [BX+8],AX       ;POSITIONS
                    ADD     BX,2
                    LOOP    SWAP_LOOP

POP     CX

MOV     SWAPPED,1       ;SET FLAG SAYING AT LEAST ONE SWAP
                                            ;IN THRU INNER LOOP
                    JMP     NEXT_J

NO_SWAP:            ADD     BX,8            ;ADJUST POINTER UP ONE CELLSPEC

NEXT_J:             POP     CX              ;RESTORE INNER LOOP COUNTER

LOOP    J_LOOP

CMP     SWAPPED,0       ;IF FLAG WAS SET, SWAPS WERE MADE
                    JNE     NOT_DONE        ;AND WE ARE NOT DONE
                    POP     CX              ;BUT IF FLAG WAS NOT SET,
                                            ;RESTORE STACK
                    JMP     LISTS_DONE      ;AND GET OUT OF SORT ROUTINE

NOT_DONE:           POP     CX              ;RESTORE OUTER LOOP COUNTER
                    LOOP    I_LOOP

;****************************************************************
; CELL SPEC LIST IS SORTED AND READY TO PROCESS SEQUENTIALLY
; NOW FIRE UP THE PRINTER, BUILD SCANLINES, AND PRINT IT ALL
;****************************************************************

LISTS_DONE:         CALL    REL_CLAMP       ; RELEASE PAPER CLAMP
```

```
                CALL        ACT_INIT        ; INITIALIZE ACTIVE LIST
                MOV         SCANLINE,0
                MOV         SOL, 01H        ; READY FIRST SOLENOID
                MOV         INSERTED, 0
                MOV         AX, CSPECS_START
                MOV         NXT2CHK,AX
                CALL        SOLENOIDS_OFF   ; RELEASE ANY SOLENOIDS THAT
                                            ; MIGHT INADVERTENTLY BE ON
                CALL        MOTOR_ON        ; START MOVING PAPER

;***************************************************************
; THIS IS THE TOP OF THE LOOP WHICH IS TRAVERSED ONCE PER SCANLINE
; FIRST WE WAIT TILL CARRIAGE RETURN DETECTED, THEN BUILD A SCANLINE
; AND DUMP IT EVERY TIME THEREAFTER THAT A PRINT CLOCK SIGNAL IS
; DETECTED.
;***************************************************************
WAIT4RST:       CALL        PRTST
                AND         AL,AL
                JZ          WAIT4RST

;***************************************************************
; CHECK NOW TO DETERMINE WHETHER ALL SCANLINES HAVE BEEN MADE
; AND, IF SO, QUIT AND TURN OFF THE MOTOR BEFORE RETURNING
;***************************************************************

WEHAVERST:      CMP         SCANLINE, MAX_SCANS
                JE          CHECK_PRINTED

CALL        BUILD_NXT_SCAN
                MOV         BIT,0;

;***************************************************************
; WAIT TILL PRINT CLOCK HAS BEEN ASSERTED
;***************************************************************

WAIT4CLK:       CALL        PRTST
                AND         AH,AH
                JZ          WAIT4CLK

;       CHECK WHETHER ALL BITS IN THE SCANLINE HAVE BEEN ACCOUNTED FOR

WEHAVECLK:      CMP         BIT,BITS_PER_SCAN
                JNE         DO_DE_BIT
                INC         SCANLINE
                JMP         WAIT4RST

; TURN OFF THE LAST SOLENOID BY TURNING OFF ALL OF THEM
; THEN FIND THE STATE OF THE CURRENT BIT AND, IF TRUE,
; FIRE PROPER SOLENOID

DO_DE_BIT:      AND         PR_SHADOW, 0F0H ; OFF ALL SOLENOIDS

CALL        ISOLATE_BIT     ; TEST BIT "BIT"
                AND         AL,AL           ; TEST VALUE PUT HERE
                                            ; BY ISOLATE_BIT
                JZ          DONT_FIRE

; WE WILL FIRE THE NEXT SOLENOID THIS TIME

FIRE_ONE:       MOV         DL,SOL
                OR          PR_SHADOW,DL

;       WE MAY OR MAY NOT HAVE ORED A SOLENOID BIT INTO THE SHADOW AT THIS POINT
```

```
DONT_FIRE:      INC     BIT             ; POINT TO NEXT BIT
                CMP     SOL,SOL4        ; IF TRUE RESET TO SOL1
                JE      SOL_IS_8
SOL_NOT_8:      SHL     SOL,1           ; OTHERWISE SET NXT SOL
                JMP     WRITE_SHADOW
SOL_IS_8:       MOV     SOL,SOL1        ; RESETS SOL TO SOL1
        ; WRITE THE VALUE IN THE SHADOW REGISTER TO THE OUTPUT PORT

WRITE_SHADOW:   MOV     AL,PR_SHADOW
                MOV     PRINT_PORT,AL

; NOW WAIT FOR THE NEXT PRINT CLOCK

JMP     WAIT4CLK

; THE LAST SCANLINE SHOULD HAVE BEEN PRINTED.
        ; NOW TURN OFF THE MOTOR AND ALL SOLENOIDS AND RETURN

CHECK_PRINTED:  CALL    MOTOR_OFF;
                CALL    SOLENOIDS_OFF

; NOW ALL DONE PRINTING, RETURN TO THE ROUTINE THAT CALLED PRNTR

;       POPA    **** 80186 INST.        ; RESTORE ALL REGISTERS REPLACED BY
                                        ; THE FOLLOWING

POP     BP
                POP     SI
                POP     DI
                POP     SS
                POP     ES
                POP     DS
                POP     DX
                POP     CX
                POP     BX
                POP     AX

RET

;ROUTINES FOR MANAGING THE ACTIVE CELL LIST

;INITIALIZING THE ACTIVE CELL LIST

ACT_INIT:       MOV     BX,OFFSET ACTIVE_CELL_TABLE
                MOV     CX,SIZE_OF_ACT
                MOV     AX,01H
INIT_ACT:       MOV     [BX+ACT_FWD_PTR1],AX  ;LINK EACH ENTRY BY
                INC     AX                    ;MAKING EACH FORWARD
                ADD     BX,5                  ;POINTER POINT TO THE
                LOOP    INIT_ACT              ;NEXT ENTRY IN THE LIST

MOV     FREE_LIST,0     ;FREE LIST STARTS WITH 0th ENTRY
                MOV     NUMBER_ACTIVE,0 ;ACTIVE LIST IS NULL
                MOV     ACTIVE_LIST,0FFFFH
```

```
                    RET                                      ;ALL DONE

;INSERTING A CELL SPEC INTO THE ACTIVE CELL LIST
        ;AX HOLDS INDEX INTO SORTED LIST OF CELL SPECS
        ;ALGORITHM IS:
        ;       OLD_ACTIVE = ACTIVE_LIST
        ;       ACTIVE_LIST = FREE_LIST
        ;       FREE_LIST = FREE_LIST(4)
        ;
        ;       ACTIVE_ENTRY(CSPINDX) = CELL SPEC INDEX
        ;       ACTIVE_ENTRY(BKPTR) = NULL   (THIS IS BACK PTR OF 1ST IN NEW ACT LIST)
        ;       ACTIVE_ENTRY(FWDPTR) = OLD_ACTIVE
        ;       IF OLD_ACTIVE NOT NULL THEN
        ;               OLD_ACTIVE ENTRY(BKPTR) = ACTIVE_LIST

INSERT_INTO_ACT:
                    CMP          NUMBER_ACTIVE,MAX_ACTIVE_CELLS
                    JAE          TOO_MANY_INSERTS
        ;   MAKE OLD_ACT = ACTIVE_LIST CX USED TO HOLD OLD_ACTIVE
                    MOV          DX,ACTIVE_LIST
                    MOV          CX, DX

;   ACTIVE_LIST = FREE_LIST
                    MOV          SI, FREE_LIST
                    MOV          ACTIVE_LIST,SI

;   FREE_LIST = FORMER 2ND ENTRY IN FREE LIST. MULTIPLY INDEX BY 6
                    SHL          SI,1
                    MOV          DI,SI
                    SHL          SI,1
                    ADD          SI,DI
                    MOV          BX, OFFSET ACTIVE_CELL_TABLE
                    MOV          DI, [BX+SI+ACT_FWD_PTR]
                    MOV          FREE_LIST, DI

;   SI STILL POINTS TO OFFSET OF NEW ACTIVE ENTRY
        ;   FIX UP THREE ENTRIES IN NEWLY ACTIVE CELL
                    MOV          [BX+SI+ACT_CSPEC_INDEX], AX  ; INDEX OF CSPEC BEING ADDED
                    MOV          WORD PTR [BX+SI+ACT_BACK_PTR],0FFFFH
                    MOV          AX, CX
                    MOV          [BX+SI+ACT_FWD_PTR],AX
                    CMP          AX,0FFFFH
                    JE           BUMP_ACTIVES

;   OLD_ACTIVE WAS NOT NULL, SO LINK ITS BACK PTR TO THE NEW HEAD OF ACTIVES
        ;   AX HOLDS OLD_ACTIVE. MULTIPLY IT BY 6
                    SHL          AX,1
                    MOV          SI,AX
                    SHL          SI,1
                    ADD          SI,AX
                    MOV          AX,ACTIVE_LIST
                    MOV          [BX+SI+ACT_BACK_PTR],AX
BUMP_ACTIVES:       INC          NUMBER_ACTIVE
TOO_MANY_INSERTS:   RET

;ROUTINE TO REMOVE EXHAUSTED CELL SPEC FROM ACTIVE LIST
;AND RETURN ITS SLOT TO FREE LIST. AX HOLDS INDEX INTO ACTIVE CELL TABLE OF;
;ENTRY TO BE REMOVED

REMOVE_FROM_ACT:
                    CMP          NUMBER_ACTIVE,0              ;IF NONE,WE HAVE
                                                              ;A PROBLEM
```

```
                    JG            OK_TO_REMOVE
                    JMP           TOO_MANY_REMOVALS
OK_TO_REMOVE:       MOV           BX,OFFSET ACTIVE_CELL_TABLE  ;HEAD OF TABLE
                    MOV           SI,AX                ;MULTIPLY INDEX BY 6
                    SHL           SI,1                 ;TO MAKE IT A BYTE
                    MOV           CX,SI                ;INDEX INTO THE ACT
                    SHL           SI,1
                    ADD           SI,CX
                    MOV           DX,[BX+SI+ACT_BACK_PTR]  ;SAVE THIS
                    MOV           BACK,DX

MOV           DX,[BX+SI+ACT_FWD_PTR]         ;AND THIS
                    MOV           FWD,DX

MOV           DX,FREE_LIST         ;LINK THIS ENTRY INTO
                    MOV           [BX+SI+ACT_FWD_PTR],DX

MOV           FREE_LIST,AX         ;FREE LIST AHEAD OF ALL OTHERS
                    CMP           BACK,0FFFFH          ;WAS HEAD OF ACT HOLDING
                    JNE           NOT_FIRST            ;THE FIRST ENTRY IN FREE LIST
FIRST:              MOV           AX,FWD               ;YES, IT WAS
                    MOV           ACTIVE_LIST,AX       ;ACTIVE NOW POINTS TO WHAT
                                                       ;THIS ENTRY USED TO POINT TO
                    MOV           SI,AX                ;MAKE THIS INTO BYTE INDEX
                    SHL           SI,1
                    MOV           CX,SI
                    SHL           SI,1
                    ADD           SI,CX
                    MOV           WORD PTR [BX+SI+ACT_BACK_PTR],0FFFFH
                                                       ;MAKE SUCESSOR'S
                                                       ;BACK PTR NULL
                                                       ;BECAUSE IT IS NEW HEAD
                                                       ;OF ACTIVE LIST
                    DEC           NUMBER_ACTIVE        ;ALL DONE
                    RET

NOT_FIRST:          CMP           FWD,0FFFFH           ;IS ENTRY TO BE REMOVED IN MIDDLE
                    JNE           MIDDLE
LAST:               MOV           SI,BACK              ;NO, IT IS LAST IN LIST
                    SHL           SI,1
                    MOV           CX,SI                ;MAKE THE PREDECESSOR'S
                    SHL           SI,1                 ;FORWARD
                    ADD           SI,CX                ;POINTER
                    MOV           WORD PTR [BX+SI+ACT_FWD_PTR],0FFFFH
                                                       ;NULL FWD PTR BECAUSE LAST
                    DEC           NUMBER_ACTIVE
                    RET                                ;ALL DONE

MIDDLE:             MOV           SI,FWD               ;CELL TO BE REMOVED IS
                    SHL           SI,1                 ;SOMEWHERE IN THE MIDDLE
                    MOV           CX,SI
                    SHL           SI,1                 ;MAKE PREDECESSOR'S
                    ADD           SI,CX                ;FWD POINTER
                    MOV           AX,BACK              ;POINT TO SUCESSOR
                    MOV           [BX+SI+ACT_BACK_PTR],AX
                    MOV           SI,AX                ;AND MAKE
                    SHL           SI,1                 ;SUCESSOR'S
                    MOV           CX,SI                ;BACK PTR
                    SHL           SI,1                 ;POINT TO
                    ADD           SI,CX                ;PREDECESSOR
                    MOV           AX,FWD
```

```
                        MOV     [BX+SI+ACT_FWD_PTR],AX
                        DEC     NUMBER_ACTIVE
TOO_MANY_REMOVALS:      RET                             ;ALL DONE

;
; ROUTINE TO DETERMINE THE STATE OF A BIT IN THE SCANLINE BUFFER

ISOLATE_BIT:            SUB     BX,BX           ; CLEAR THIS REGISTER
                        MOV     BL,BIT          ; GET INDEX OF BIT IN
                                                ;   SCANLINE BUFFER
                        MOV     DL,BL           ; SAVE IT TEMPORARILY
                        MOV     CX,3            ; FOR DIVIDE BY 8 TO GET
                        SHR     BX,CL           ;  BYTE INDEX OF BUFF
                        AND     DL,7            ; FIND BIT REMAINDER
                        INC     DL              ; FOR BITS TO SHIFT OUT
                        ADD     BX,OFFSET BUFF  ; POINT TO BYTE IN MEM
                        MOV     AL,[BX]         ; READ BYTE OF BUFF
                        MOV     CL,DL           ; SHIFT COUNT
                        SHL     AL,CL           ; SHIFT DESIRED BIT OUT
                                                ; TO CARRY FLAG
                        JC      SET_BIT         ; IF CARRY THEN BIT = T
                        SUB     AX,AX           ; CLR AX IF BIT FALSE
                        RET
SET_BIT:                MOV     AX,1            ; SET AX IF BIT TRUE
                        RET

; ROUTINE TO TURN OFF ALL FOUR SOLENOIDS

SOLENOIDS_OFF:          AND     PR_SHADOW, NOT_SOLENOIDS
                        MOV     AL, PR_SHADOW
                        MOV     PRINT_PORT, AL
                        RET
; ROUTINE TO TURN MOTOR ON

MOTOR_ON:               OR      PR_SHADOW, MTRDRV
                        AND     PR_SHADOW, NOT_MTRSTP
                        MOV     AL, PR_SHADOW
                        MOV     PRINT_PORT,AL
                        RET

; ROUTINE TO TURN MOTOR OFF

MOTOR_OFF:              OR      PR_SHADOW, MTRSTP
                        AND     PR_SHADOW, NOT_MTRDRV
                        MOV     AL, PR_SHADOW
                        MOV     PRINT_PORT, AL
                        RET

; ROUTINE TO REMOVE ALL POWER FROM MOTOR

MTR_PWR_OFF:            AND     PR_SHADOW, NOT_MTRSTP
                        AND     PR_SHADOW, NOT_MTRDRV
                        MOV     AL, PR_SHADOW
                        MOV     PRINT_PORT, AL
                        RET
```

```
; ROUTINE TO FIRE A SOLENOID; WHATEVER VALUE IS IN SOL WHEN THIS ROUTINE
; IS CALLED WILL BE OUTPUT; ALL OTHER SOLENOIDS WILL BE TURNED OFF

FIRE_SOLENOID:      AND         PR_SHADOW, NOT_SOLENOIDS
                    MOV         AL, SOL
                    OR          PR_SHADOW, AL
                    MOV         PRINT_PORT, AL
                    RET

; ROUTINE TO SET THE STATE OF THE PAPER CLAMP TRUE, TO HOLD THE PAPER

SET_CLAMP:          OR          PR_SHADOW, CLAMP_ON
                    MOV         AL, PR_SHADOW
                    MOV         PRINT_PORT, AL
                    RET

; ROUTINE TO RELEASE THE PAPER CLAMP

REL_CLAMP:          AND         PR_SHADOW, CLAMP_OFF
                    MOV         AL, PR_SHADOW
                    MOV         PRINT_PORT, AL
                    RET
;****************************************************************
;
; ROUTINE TO BUILD THE NEXT SCANLINE USING THE ACTIVE CELL TABLE, THE CURRENT
; SCANLINE, AND ALL THE VALUES IN THE ACTIVE CELL SPECS
;
;****************************************************************

;       FIRST, CLEAR OUT THE OLD BUFFER SO ALL NEW DATA MAY BE ORED IN

BUILD_NXT_SCAN:
                    MOV         CX,08H      ; NUMBER OF WORDS TO CLEAR
                    SUB         AX,AX       ; CLEAR THIS TO ZERO
                    MOV         BX, OFFSET BUFF
CLR_BUFF:           MOV         [BX], AX;
                    INC         BX
                    INC         BX
                    LOOP        CLR_BUFF

;       NEXT FIND ANY NEW ACTIVE CELL SPECS TO INSERT INTO THE ACTIVE LIST
;       CHECK WHETHER ALL CSPECS HAVE BEEN MADE ACTIVE BY THIS TIME

CHECK4INSRT:        MOV         DX, INSERTED
                    CMP         DX, TOTAL_CELLS
                    JE          PROCESS_ACT

;       IF THEY HAVE NOT ALL BEEN PLACED INTO ACT THEN CHECK TO SEE IF ANY
;       WILL GO INTO ACT FOR THIS SCANLINE

MOV         BX, NXT2CHK     ; OFFS OF NXT CSPEC TO CHECK
                    MOV         AX,[BX]         ; AX NOW HAS SCANLINE
                    CMP         AX,SCANLINE     ; IS IT = CURRENT SCANLINE?
                    JNE         PROCESS_ACT     ; IF NOT, NO INSERTS

;       NOW INSERT CELLS INTO ACT WHILE THEIR SCANLINES ARE
;       EQUAL TO CURRENT SCANLINE

INSERT_CELL:        MOV         AX,BX           ; OFFS OF CSPEC TO INSERT
```

```
            INC        INSERTED        ; INDEX OF CSPEC TO GO IN
            CALL       INSERT_INTO_ACT
            ADD        NXT2CHK, CSPEC_SIZE_IN_BYTES
            JMP        CHECK4INSRT

;   NOW PROCESS ALL ACTIVE CELLS FIRST CECK WHETHER ANY ARE ACTIVE

PROCESS_ACT:   CMP        NUMBER_ACTIVE,0
               JB         SOME_R_ACTV
               RET                         ; BECAUSE NONE R ACTIVE

SOME_R_ACTV:   MOV        SI,ACTIVE_LIST   ; INDX OF ACT OF 1ST ENT
               MOV        NEXT_ENT,SI      ; IS NEXT TO LOOK AT
NEXT_CSPEC:    MOV        SI,NEXT_ENT      ; NEXT IS CURRENT
               MOV        THIS_ENT,SI      ; ONE TO LOOK AT
               SHL        SI,1             ; MAKE THIS_ENT AN INDX
               MOV        DI,SI
               SHL        SI,1
               ADD        SI,DI

;   SAVE INDEX IN ACT OF NEXT ENTRY TO CHECK, MAY BE FFFF IF NO MORE

MOV        BX,OFFSET ACTIVE_CELL_TABLE
               MOV        DX,[BX+SI+ACT_FWD_PTR] ; LINK TO NXT ACTIVE CELL
               MOV        NEXT_ENT,DX

;   NOW GET OFFSET OF CSPEC TO EXAMINE FIRST; BX STILL HAS OFFSET OF ACT

MOV        BX,[BX+SI]       ; CSPEC OFFSET IN SORTED TABLE

;   PROCESS ONE CELL SPEC

MOV        DI,[BX+CSPEC_XBYTEOFFS]
               AND        DI, 00FFH        ; WE ONLY WANT BYTE IN LOW
                                           ; HALF OF DI REG
               MOV        SI,[BX+CSPEC_FMEMOFFS]
               SUB        CX,CX
               MOV        CL,[BX+CSPEC_WIDTH]
               SUB        DX,DX            ; CLEAR SAVE REGISTER
ONE_CELL:      SUB        AX,AX            ; CLEAR WORK REGISTER
               MOV        AH, CS:[SI]      ; READ A BYTE OF FONT MEM
                                           ; FROM CODE SEGMENT
               PUSH       CX
               MOV        CL,[BX+CSPEC_XBITOFFS]
               SHR        AX,CL            ; ALIGN WITH SCANLINE
                                           ; BIT OFFSET
               POP        CX               ; RESTORE WIDTH LOOP CTR
               OR         AH,DH            ; OR IN SAVED BITS FROM
                                           ; PREVIOUS BYTE
               MOV        BP, OFFSET BUFF
               OR         DS:[BP+DI],AH    ; OR DATA INTO SCANLINE
               MOV        DH,AL            ; SAVE BITS SHIFTED OUT
               INC        DI               ; INC SCANLINE BYTE INDEX
               INC        SI               ; INC FONT MEM INDEX
               LOOP       ONE_CELL
;   NOW IF DH NOT ZERO THEN THERE WAS DATA SHIFTED OUT OF AX WHICH MUST
;   ALSO BE ORED INTO THE SCANLINE. THE BYTE OFFSET IN DI HAS BEEN INCREMENTED
;   SO JUST OR IN DH RATHER THAN AH

OR         DS:[BP+DI],DH

MOV        [BX+CSPEC_FMEMOFFS],SI
                                           ; UPDATE FONT MEM OFFSET
```

```
            DEC     BYTE PTR [BX+CSPEC_HEIGHT]
            JNZ     GETNXTCSPC
            MOV     AX,THIS_ENT
            CALL    REMOVE_FROM_ACT
GETNXTCSPC: CMP     NEXT_ENT, OFFFFH
            JNE     NEXT_CSPEC

NO_MORE_ACTV: RET                           ; ALL ACTIVE CELLS PROCESSED
```

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

I claim:

1. A method for securing a money order dispenser having a digital processor for controlling the operation of the dispenser, a keyboard for entering transaction data, a memory associated with said processor, and a printer for printing alphanumeric indicia on a money order, comprising the steps of:
   (a) defining one or more events associated with said dispenser for indicating that the security of the dispenser has been compromised, the occurrence of any of said events defining a compromised condition;
   (b) storing a security inhibit printing code in said memory for controlling the operation of said printer;
   (c) determining whether the dispenser is in a compromised condition; and
   (d) if a compromised condition exists, changing said security inhibit printing code to inhibit operation of said printer.

2. The method for securing a money order dispenser as described in claim 1 further including the steps of:
   (e) storing a new security inhibit printer code in said memory after the compromised condition has been rectified; and
   (f) controlling said printer to print said money order.

3. The method for securing a money order dispenser as described in claim 1 wherein said events include opening of a storage compartment cover of said dispenser outside of a proper money order loading sequence.

4. The method for securing a money order dispenser as described in claim 1 wherein said events include removal of a bottom panel of said dispenser without a service request.

5. The method for securing a money order dispenser as described in claim 1 wherein said events include interrupting power to the dispenser.

6. A money order dispenser for dispensing money orders at a retail establishment, comprising:
   a data collector controlled by a system operator for managing the security and operation of the dispenser;
   a digital processor for controlling the operation of the dispenser;
   a digital processor keyboard connected to the digital processor for entering transaction data by the vendor;
   a data collector keyboard connected to the data collector for entering the control data and the initial first and second security codes by the system operator for managing the operation of the dispenser;
   a first security code authorizing access to the dispenser to enable entry of the transaction data;
   a second security code authorizing the printing of a money order;
   a display connected to the digital processor for displaying the transaction data entered on the digital processor keyboard;
   a memory associated with the digital processor and the data collector for storing the transaction data and the control data;
   a printer controlled by the digital processor for receiving a money order and printing alphanumeric indicia thereon;
   means for detecting entry of the first and second security codes via the digital processor keyboard and for detecting if the security of the dispenser is compromised;
   control means responsive to the detecting means for inhibiting entry of the transaction data via the digital processor keyboard when the first security code is not properly entered on the digital processor keyboard, for preventing the printing of a money order when the second security code is not properly entered on the digital processor keyboard, and for preventing operation of the dispenser when the security of the dispenser is compromised; and
   means for changing the initial first and second security codes via the data collector by the system operator if the security of the dispenser is compromised or if any of the parameters of the control data entered via the data collector by the system operator are compromised or exceeded.

7. A money order dispenser in accordance with claim 6, wherein the initial first and second security codes established by the system operator comprise a five (5) digit number that is not displayed.

8. A money order dispenser in accordance with claim 6, wherein the initial first and second security codes are stored by the system operator in the data collector in an electrically-erasable, programmable read only memory ($E^2$PROM) which is down loaded from the data collector to the dispenser.

9. A money order dispenser in accordance with claim 6, wherein the system operator via the data collector sets predetermined values for the following control data for the dispenser:
   (a) the total number of money orders to be printed before the dispenser must be reauthorized;
   (b) the maximum money order dollar amount to be issued before the dispenser must be reauthorized;
   (c) the maximum dollar value per money order per customer;
   (d) the maximum number of vendor payments which may be printed before the dispenser must be reauthorized;

(e) the maximum vendor payment dollar amount which can be issued before the dispenser must be reauthorized;

(f) the maximum number of money orders that can be printed per customer;

(g) the maximum number of vendor payments which can be printed per vendor;

(h) the maximum dollar amount per vendor payment;

(i) the number of blank money orders left in dispenser when warning is issued;

(j) the amount of transaction storage left in dispenser memory when warning is issued;

(k) the number of errors allowed before the dispenser locks.

10. A money order dispenser in accordance with claim 6 wherein the security of the dispenser is compromised and new initial security codes established by the system operator when any employee with knowledge of the security codes leaves the employment of the system operator.

11. A money order dispenser for dispensing money orders at a retail establishment, comprising:

a digital processor for controlling the operation of the dispenser;

a digital processor keyboard connected to the digital processor for entering transaction data by the vendor;

a first security code authorizing access to the dispenser to enable entry of the transaction date;

a second security code authorizing the printing of a money order;

a display connected to the digital processor for displaying the transaction data entered on the digital processor keyboard;

a memory associated with the digital processor for storing the transaction data and the control data;

a printer controlled by the digital processor for receiving a money order and printing alphanumeric indicia thereon;

means for entering the control data and the initial first and second security codes;

means for changing the initial first and second security codes if the security of the dispenser is compromised or if any of the parameters of the control data are compromised or exceeded;

means for detecting entry of the first and second security codes via the digital processor keyboard and for detecting if the security of the dispenser is compromised; and control means responsive to the detecting means for inhibiting entry of the transaction data via the digital processor keyboard when the first security code is not properly entered on the digital processor keyboard, for preventing the printing of a money order when the second security code is not properly entered on the digital processor keyboard, and for preventing operation of the dispenser when the security of the dispenser is compromised.

* * * * *

UNITED STATES PATENT AND TRADEMARK OFFICE
CERTIFICATE OF CORRECTION

PATENT NO. : 4,812,986

DATED : March 14, 1989

INVENTOR(S) : Lawrence G. Smith

It is certified that error appears in the above-identified patent and that said Letters Patent is hereby corrected as shown below:

Column 75, line 31, change "the transaction date" to --control data--.
Column 76, line 22, change "transaction" to --control--.

Signed and Sealed this

Twelfth Day of December, 1989

Attest:

JEFFREY M. SAMUELS

Attesting Officer     Acting Commissioner of Patents and Trademarks

UNITED STATES PATENT AND TRADEMARK OFFICE
CERTIFICATE OF CORRECTION

PATENT NO. : 4,812,986
DATED : March 14, 1989
INVENTOR(S) : Lawrence G. Smith

It is certified that error appears in the above-indentified patent and that said Letters Patent is hereby corrected as shown below:

On the Title Page:

[ * ] Notice: --

Replace: The portion of the term of this patent subsequent to Nov. 16, 1999 has been disclaimed.

With: --The term of this patent shall not extend beyond the expiration date of Pat. No. 4,870,596--.

Signed and Sealed this

Seventeenth Day of February, 1998

*Attest:*

BRUCE LEHMAN

*Attesting Officer*     *Commissioner of Patents and Trademarks*